(12) United States Patent
Russell et al.

(10) Patent No.: US 7,291,002 B2
(45) Date of Patent: Nov. 6, 2007

(54) APPARATUS AND METHODS FOR 3D PRINTING

(75) Inventors: David Russell, Burlington, MA (US); Andres Hernandez, Malden, MA (US); Joshua Kinsley, Arlington, MA (US); Andrew Berlin, Gloucester, MA (US)

(73) Assignee: Z Corporation, Burlington, MA (US)

( * ) Notice: Subject to any disclaimer, the term of this patent is extended or adjusted under 35 U.S.C. 154(b) by 422 days.

(21) Appl. No.: 10/817,159

(22) Filed: Apr. 2, 2004

(65) Prior Publication Data

US 2004/0265413 A1    Dec. 30, 2004

Related U.S. Application Data

(60) Provisional application No. 60/472,922, filed on May 23, 2003.

(51) Int. Cl.
*B28B 13/02*    (2006.01)
(52) U.S. Cl. .................. 425/447; 425/375; 425/174.4; 264/308; 700/119
(58) Field of Classification Search ............... 425/375, 425/174.4; 264/308, 401; 700/119, 120
See application file for complete search history.

(56) References Cited

U.S. PATENT DOCUMENTS

| | | | |
|---|---|---|---|
| 4,247,508 A | 1/1981 | Housholder | |
| 4,575,330 A | 3/1986 | Hull | |
| 4,752,352 A | 6/1988 | Feygin | |
| 4,853,717 A | 8/1989 | Harmon et al. | |
| 4,863,538 A | 9/1989 | Deckard | |
| 4,872,026 A | 10/1989 | Rasmussen et al. | |
| 4,929,402 A | 5/1990 | Hull | |
| 4,938,816 A | 7/1990 | Beaman et al. | |
| 4,944,817 A | 7/1990 | Bourell et al. | |
| 4,996,010 A | 2/1991 | Modrek | |
| 5,017,753 A | 5/1991 | Deckard | |
| 5,027,134 A | 6/1991 | Harmon et al. | |
| 5,053,090 A | 10/1991 | Beaman et al. | |
| 5,076,869 A | 12/1991 | Bourell et al. | |
| 5,103,244 A | 4/1992 | Gast et al. | |
| 5,115,250 A | 5/1992 | Harmon et al. | |

(Continued)

FOREIGN PATENT DOCUMENTS

DE    29907262    *    8/1999

(Continued)

OTHER PUBLICATIONS

Evaluation of the Advanced Ceramics Market for New Applications of Three Dimensional Printing, M.S. Thesis, MIT 1995.

(Continued)

*Primary Examiner*—Robert Davis
*Assistant Examiner*—Maria Veronica Ewald
(74) *Attorney, Agent, or Firm*—Goodwin Procter LLP

(57) ABSTRACT

The invention relates to apparatus and methods for producing three-dimensional objects and auxiliary systems used in conjunction with the aforementioned apparatus and methods. The apparatus and methods involve continuously printing radially about a circular and/or rotating build table using multiple printheads. The apparatus and methods also include optionally using multiple build tables. The auxiliary systems relate to build material supply printhead cleaning diagnostics, and monitoring operation of the apparatus.

26 Claims, 19 Drawing Sheets

U.S. PATENT DOCUMENTS

| | | |
|---|---|---|
| 5,132,143 A | 7/1992 | Deckard |
| 5,134,569 A | 7/1992 | Masters |
| 5,137,662 A | 8/1992 | Hull et al. |
| 5,146,243 A | 9/1992 | English et al. |
| 5,147,587 A | 9/1992 | Marcus et al. |
| 5,155,324 A | 10/1992 | Deckard et al. |
| 5,174,943 A | 12/1992 | Hull |
| 5,184,307 A | 2/1993 | Hull et al. |
| 5,204,055 A | 4/1993 | Sachs et al. |
| 5,216,449 A | 6/1993 | English |
| 5,238,614 A | 8/1993 | Uchinono et al. |
| 5,252,264 A | 10/1993 | Forderhase et al. |
| 5,260,009 A | 11/1993 | Penn |
| 5,263,130 A | 11/1993 | Pomerantz et al. |
| 5,273,691 A | 12/1993 | Hull et al. |
| 5,296,062 A | 3/1994 | Bourell et al. |
| 5,301,863 A | 4/1994 | Prinz et al. |
| 5,316,580 A | 5/1994 | Deckard |
| 5,340,656 A | 8/1994 | Sachs et al. |
| 5,342,919 A | 8/1994 | Dickens et al. |
| 5,344,298 A | 9/1994 | Hull |
| 5,345,391 A | 9/1994 | Hull et al. |
| 5,352,405 A | 10/1994 | Beaman et al. |
| 5,382,308 A | 1/1995 | Bourell et al. |
| 5,387,380 A | 2/1995 | Cima et al. |
| 5,393,613 A | 2/1995 | Mackay |
| 5,430,666 A | 7/1995 | DeAngelis et al. |
| 5,433,280 A | 7/1995 | Smith |
| 5,448,270 A | 9/1995 | Osborne |
| 5,450,105 A | 9/1995 | Dangelo |
| 5,460,758 A | 10/1995 | Langer et al. |
| 5,490,882 A | 2/1996 | Sachs et al. |
| 5,490,962 A | 2/1996 | Cima et al. |
| 5,501,824 A | 3/1996 | Almquist et al. |
| 5,518,680 A | 5/1996 | Cima et al. |
| 5,527,877 A | 6/1996 | Dickens et al. |
| 5,534,896 A | 7/1996 | Osborne |
| 5,554,336 A | 9/1996 | Hull |
| 5,555,481 A | 9/1996 | Rock et al. |
| 5,556,590 A | 9/1996 | Hull |
| 5,559,538 A | 9/1996 | Nguyen et al. |
| 5,569,431 A | 10/1996 | Hull |
| 5,571,471 A | 11/1996 | Hull |
| 5,573,722 A | 11/1996 | Hull |
| 5,587,729 A | 12/1996 | Lee et al. |
| 5,597,589 A | 1/1997 | Deckard |
| 5,616,294 A | 4/1997 | Deckard |
| 5,622,577 A | 4/1997 | O'Connor |
| 5,630,981 A | 5/1997 | Hull |
| 5,637,175 A | 6/1997 | Feygin et al. |
| 5,639,070 A | 6/1997 | Deckard |
| 5,640,183 A | 6/1997 | Hackleman |
| 5,640,667 A | 6/1997 | Freitag et al. |
| 5,648,450 A | 7/1997 | Dickens, Jr. et al. |
| 5,653,925 A | 8/1997 | Batchelder |
| 5,682,186 A | 10/1997 | Bohorquez et al. |
| 5,712,668 A | 1/1998 | Osborne et al. |
| 5,733,497 A | 3/1998 | McAlea et al. |
| 5,738,817 A | 4/1998 | Danforth et al. |
| 5,745,133 A | 4/1998 | Hendricks et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,757,395 A | 5/1998 | Chew et al. |
| 5,776,409 A | 7/1998 | Almquist et al. |
| 5,812,157 A | 9/1998 | Nguyen et al. |
| 5,837,960 A | 11/1998 | Lewis et al. |
| 5,867,184 A | 2/1999 | Quintana |
| 5,876,550 A | 3/1999 | Feygin et al. |
| 5,902,441 A | 5/1999 | Bredt et al. |
| 5,917,516 A | 6/1999 | Nguyen et al. |
| 5,956,053 A | 9/1999 | Michael |
| 5,976,339 A | 11/1999 | Andre et al. |
| 6,000,779 A | 12/1999 | Ng et al. |
| 6,007,318 A | 12/1999 | Russell et al. |
| 6,027,209 A | 2/2000 | Menendez et al. |
| 6,027,682 A | 2/2000 | Almquist et al. |
| 6,112,109 A | 8/2000 | D'Urso |
| 6,116,719 A | 9/2000 | Maza |
| 6,135,585 A | 10/2000 | Johnson et al. |
| 6,193,353 B1 | 2/2001 | Vives et al. |
| 6,199,973 B1 | 3/2001 | Bartolome et al. |
| 6,220,689 B1 | 4/2001 | Sturgeon |
| 6,241,337 B1 | 6/2001 | Sharma et al. |
| 6,250,736 B1 | 6/2001 | Wojcik |
| 6,270,183 B1 | 8/2001 | Gaarder |
| 6,280,014 B1 | 8/2001 | Sharma et al. |
| 6,286,929 B1 | 9/2001 | Sharma et al. |
| 6,290,323 B1 | 9/2001 | Sharma et al. |
| 6,309,044 B1 | 10/2001 | Gaarder |
| 6,312,090 B1 | 11/2001 | Griffin et al. |
| 6,347,858 B1 | 2/2002 | Faisst, Jr. et al. |
| 6,350,007 B1 | 2/2002 | Meichle et al. |
| 6,375,847 B1 | 4/2002 | Hartmann |
| 6,375,874 B1 | 4/2002 | Russell et al. |
| 6,386,678 B1 | 5/2002 | Michael et al. |
| 6,390,593 B1 | 5/2002 | DeRoos et al. |
| 6,401,001 B1 | 6/2002 | Jang et al. |
| 6,402,288 B2 | 6/2002 | Rhodes et al. |
| 6,416,850 B1 | 7/2002 | Bredt et al. |
| 6,533,388 B2 | 3/2003 | Toh et al. |
| 6,540,323 B1 | 4/2003 | Dowell et al. |
| 6,550,891 B1 | 4/2003 | Berg |
| 6,609,779 B2 | 8/2003 | Davis et al. |
| 6,612,824 B2 * | 9/2003 | Tochimoto et al. ......... 425/130 |
| 6,623,098 B2 | 9/2003 | Davis |
| 6,658,314 B1 | 12/2003 | Gothait |
| 6,838,035 B1 | 1/2005 | Ederer et al. |
| 6,841,116 B2 * | 1/2005 | Schmidt ................... 264/401 |
| 6,898,477 B2 | 5/2005 | Loughran |
| 6,918,648 B2 | 7/2005 | Tee et al. |
| 6,932,935 B1 | 8/2005 | Oberhofer et al. |
| 2001/0000434 A1 | 4/2001 | Medin |
| 2001/0010526 A1 | 8/2001 | Barinaga |
| 2001/0050031 A1 | 12/2001 | Bredt et al. |
| 2002/0047229 A1 * | 4/2002 | Yanagisawa et al. ....... 264/401 |
| 2002/0075349 A1 | 6/2002 | Sawicki |
| 2002/0079601 A1 | 6/2002 | Russell et al. |
| 2002/0186271 A1 | 12/2002 | Yamada et al. |
| 2003/0004599 A1 | 1/2003 | Herbak |
| 2003/0081047 A1 | 5/2003 | Yearout |
| 2004/0056378 A1 | 3/2004 | Bredt et al. |
| 2004/0164436 A1 | 8/2004 | Khoshnevis |
| 2004/0182510 A1 | 9/2004 | Pfeifer et al. |
| 2004/0196333 A1 | 10/2004 | Yoshiyama et al. |
| 2004/0207123 A1 | 10/2004 | Patel et al. |
| 2004/0224173 A1 | 11/2004 | Boyd et al. |
| 2004/0232583 A1 | 11/2004 | Monsheimer et al. |
| 2004/0239009 A1 | 12/2004 | Collins et al. |
| 2004/0251574 A1 | 12/2004 | Collins et al. |
| 2004/0262803 A1 | 12/2004 | Neilsen et al. |
| 2005/0017394 A1 | 1/2005 | Hochsmann et al. |
| 2005/0072113 A1 | 4/2005 | Collins et al. |
| 2005/0179722 A1 | 8/2005 | Silverbrook |
| 2005/0179733 A1 | 8/2005 | Silverbrook |
| 2005/0189442 A1 | 9/2005 | Hussanini et al. |

FOREIGN PATENT DOCUMENTS

| | | |
|---|---|---|
| EP | 0 431 924 | 6/1991 |
| EP | 0 694 396 | 1/1996 |
| EP | 1 074 389 | 2/2001 |
| EP | 1 164 020 | 12/2001 |
| EP | 1 310 369 | 5/2003 |

| | | |
|---|---|---|
| WO | WO 91/12120 | 8/1991 |
| WO | 93/25336 | 12/1993 |
| WO | 95/30503 | 11/1995 |
| WO | WO 95/34468 | 12/1995 |
| WO | WO 00/68016 | 1/1996 |
| WO | 97/11835 | 4/1997 |
| WO | 98/09798 | 3/1998 |
| WO | 98/28124 | 7/1998 |

OTHER PUBLICATIONS

International Search Report for International Patent Application No. PCT/US2004/01085, dated Feb. 4, 2004, 7 pages.

\* cited by examiner

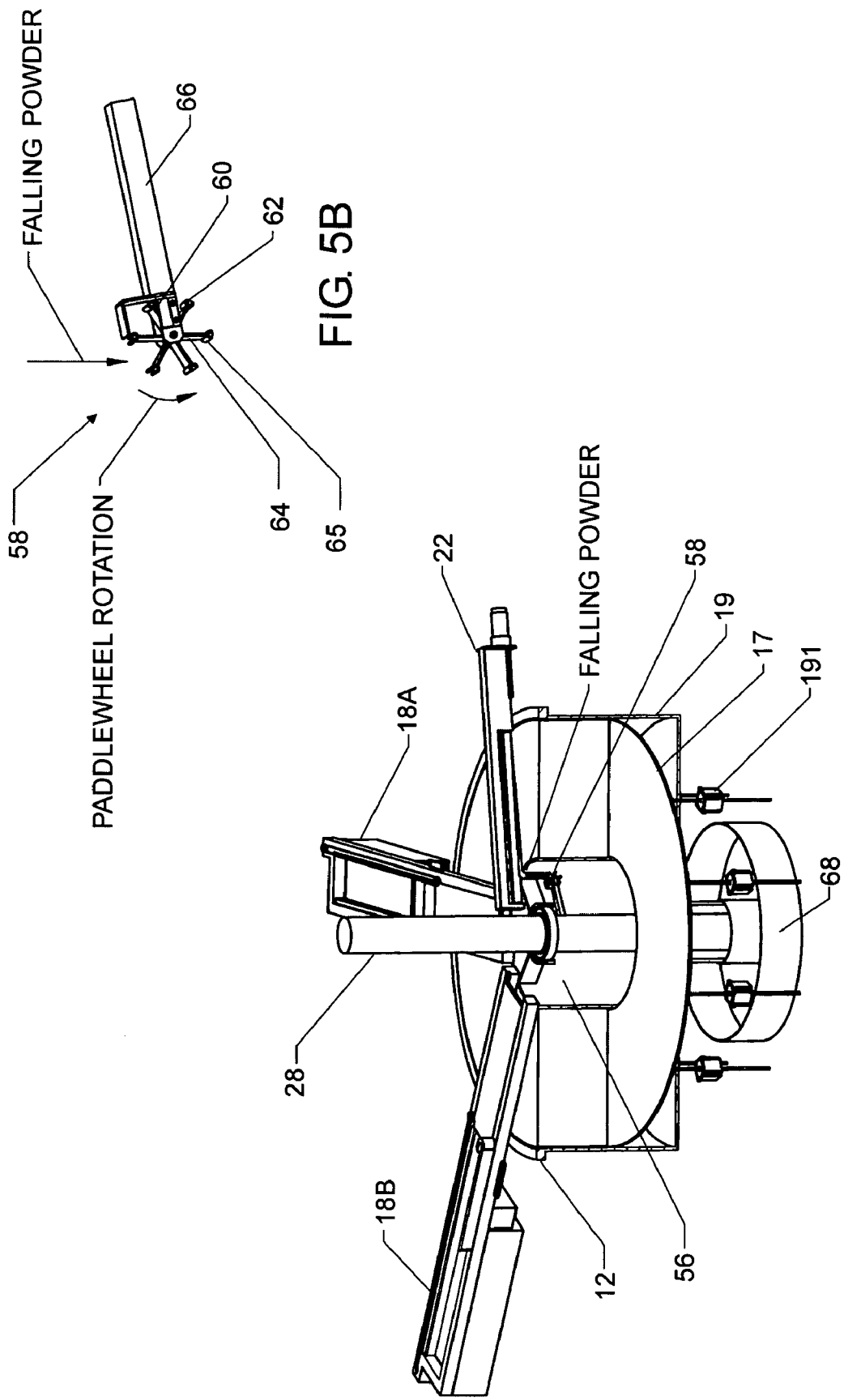

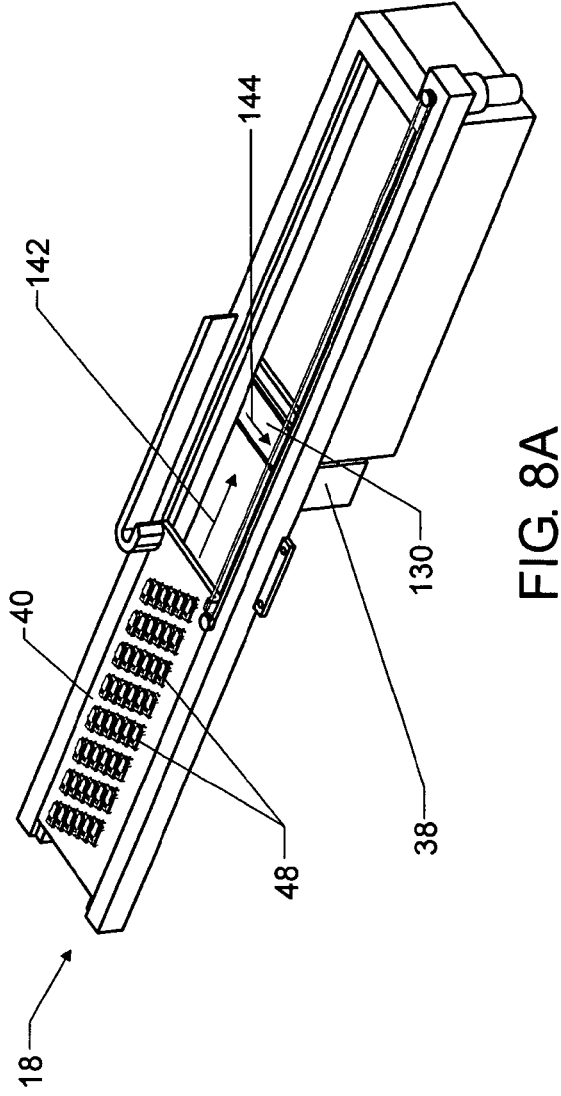
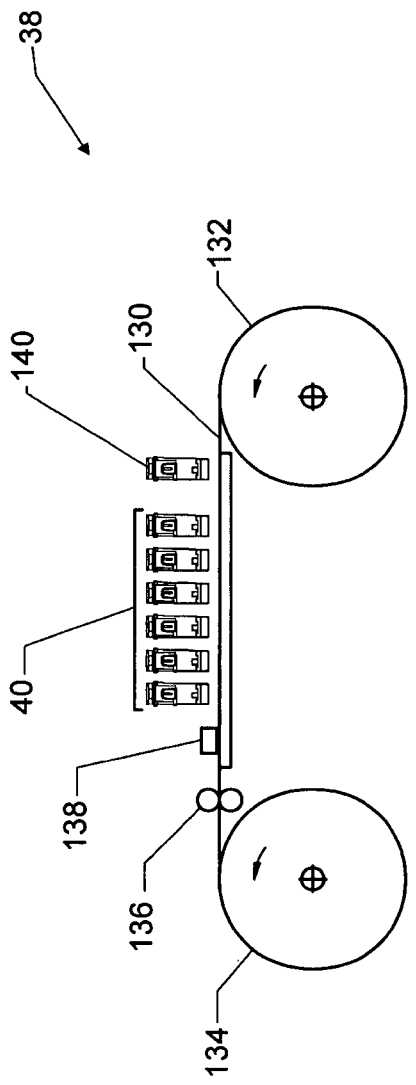
FIG. 8A
FIG. 8B

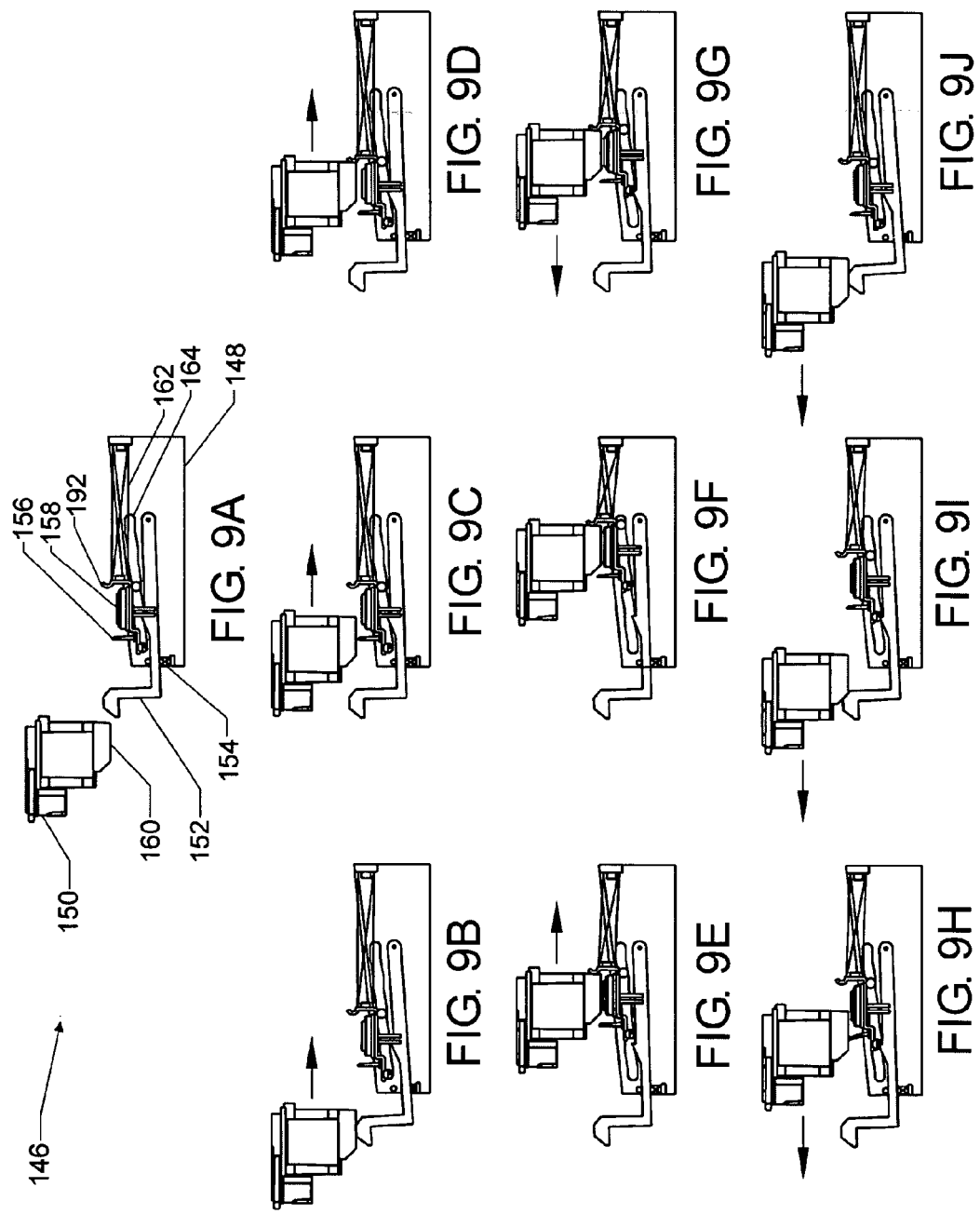

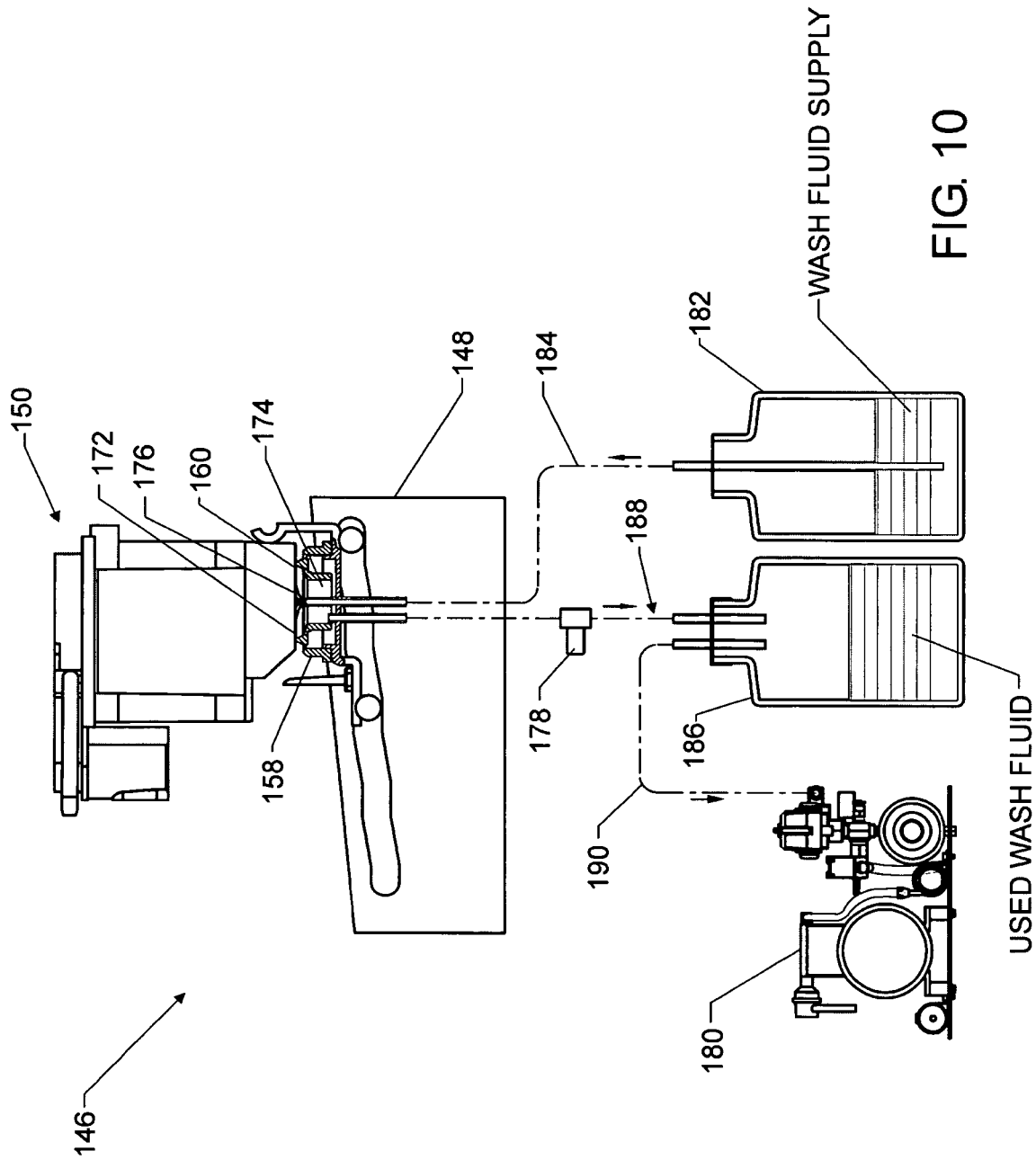

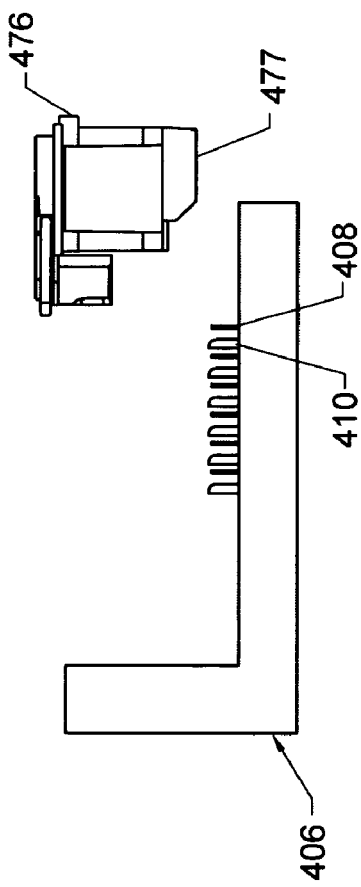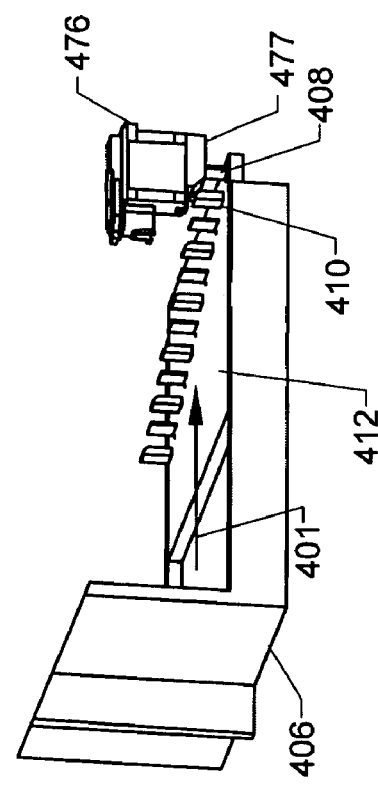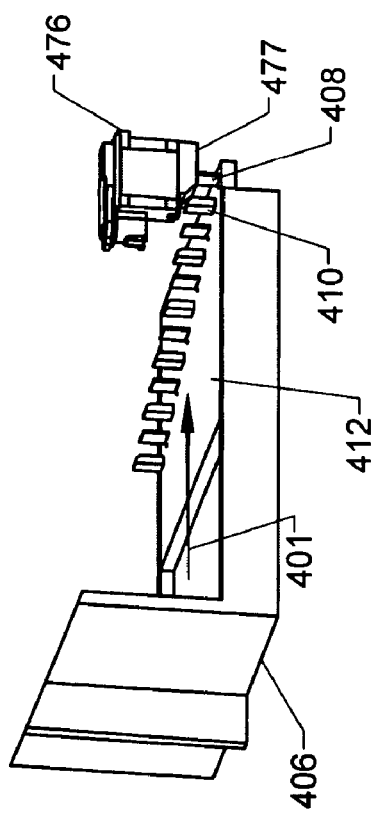

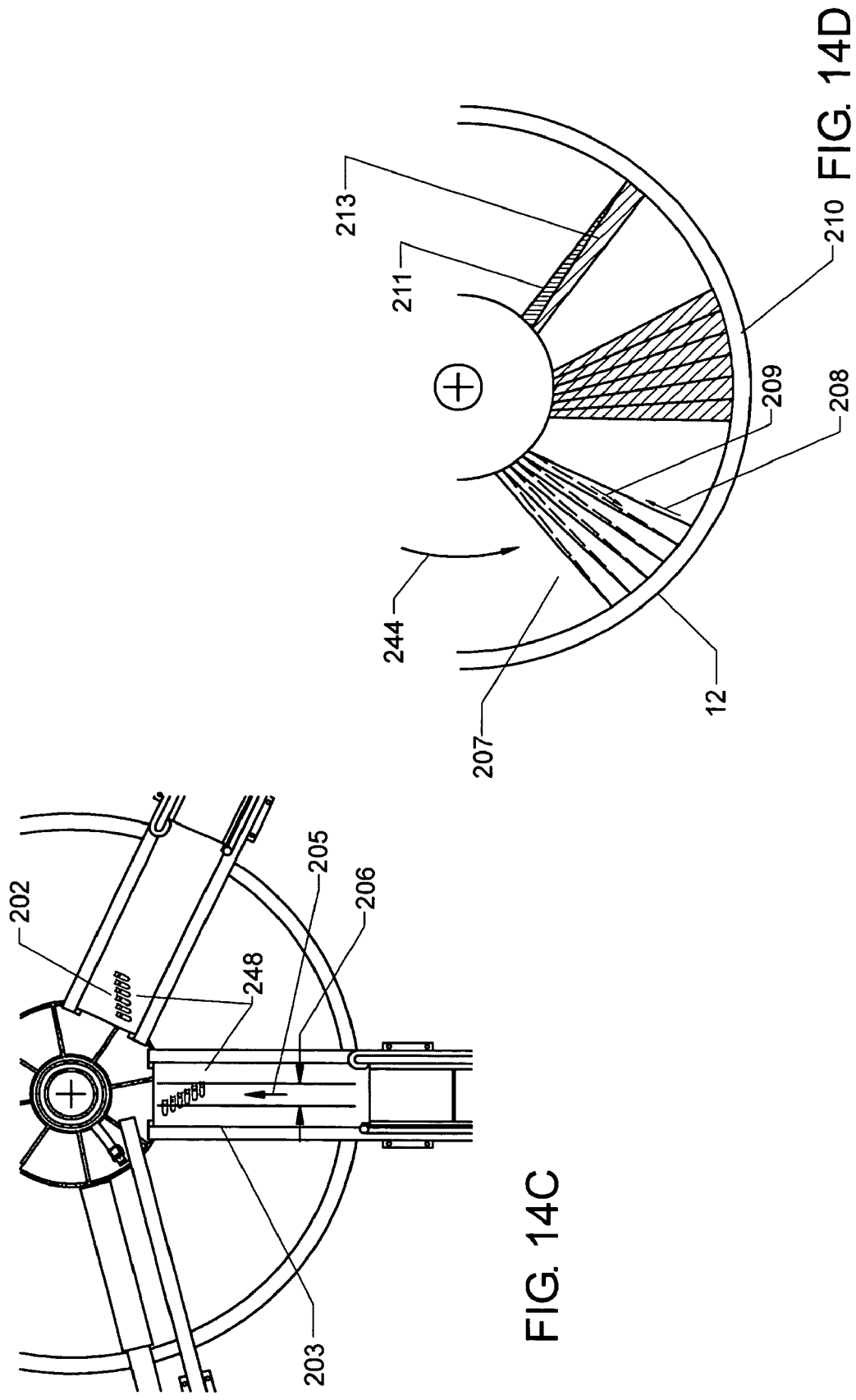

APPARATUS AND METHODS FOR 3D PRINTING

CROSS-REFERENCE TO RELATED APPLICATION

This application incorporates by reference, and claims priority to and the benefit of, U.S. Provisional Patent Application Ser. No. 60/472,922, which was filed on May 23, 2003.

FIELD OF THE INVENTION

The present invention relates to apparatus and methods for creating three-dimensional objects by printing.

BACKGROUND

Generally, 3D printing involves the use of an inkjet type printhead to deliver a liquid or colloidal binder material to layers of a powdered build material. The printing technique involves applying a layer of a powdered build material to a surface typically using a roller. After the build material is applied to the surface, the printhead delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed. See, for example, U.S. Pat. Nos. 6,375,874 and 6,416,850, the disclosures of which are incorporated herein by reference in their entireties.

Apparatus for carrying out 3D printing typically move the printheads over the print surface in raster fashion along orthogonal X and Y axes. In addition to the time spent printing, each printhead move requires time for acceleration, deceleration, and returning the printhead to the starting position of the next move. The inefficiencies inherent in these reciprocating motions reduce the productivity of the 3D printing process.

It is, therefore, an object of the present invention to provide apparatus and methods for continuously and efficiently performing 3D printing.

SUMMARY

Generally, the invention relates to apparatus and methods for producing three-dimensional objects, such as casting cores, toys, bottles, cans, architectural models, automotive parts, molecular models, models of body parts, cell phone housings, and footwear, more rapidly and efficiently than heretofore achievable. Additionally, the invention relates to systems and methods for maintaining and operating the aforementioned apparatus. In particular, if a user wants to produce large volumes of three-dimensional objects rapidly, a 3D printing apparatus in accordance with the invention can achieve a high throughput by continuously printing, using multiple printheads.

In one aspect, the invention relates to an apparatus for fabricating a three-dimensional object from a representation of the object stored in memory. The apparatus includes a rotary build table for receiving successive layers of a build material and an array having at least one printhead disposed above the build table. In one embodiment, the rotary table rotates continuously.

In another aspect, the invention relates to an apparatus for fabricating a three-dimensional object from a representation of the object stored in memory. The apparatus includes a generally circular build table for receiving successive layers of a build material and an array having at least one printhead disposed above the build table and movable relative to the build table. In one embodiment, the generally circular build table is movable in a vertical direction. In various embodiments, the printhead is movable over at least a portion of a build surface defined by the generally circular build table and the printhead can move continuously about the build table. In one embodiment, the array is configured to dispense fluid at substantially any radial location of the build table by moving the array radially to the desired location.

In yet another aspect, the invention relates to a method of fabricating a three-dimensional object. The method includes the steps of depositing successive layers of a build material on a rotary build table and depositing a liquid in a predetermined pattern on each successive layer of the build material to form the three-dimensional object. In various embodiments, the method includes the steps of: rotating the build table continuously, distributing the build material over at least a portion of the build table with a spreader, measuring an amount of excess build material deposited on the build table, and adjusting the amount of build material deposited on the build table based on the amount of excess build material measured. Additionally, the liquid can be deposited by an array of one or more printheads.

In still another aspect, the invention relates to a method of fabricating a three-dimensional object. The method includes the steps of depositing successive layers of a build material on a generally circular build table and depositing a liquid in a predetermined pattern on each successive layer of the build material to form the three-dimensional object. In various embodiments, the liquid is deposited by an array of at least one printhead and the printhead is movable over at least a portion of a build surface defined by the generally circular build table. In addition, the printhead can move continuously about the build table and the build table can move in a vertical direction.

In various embodiments of the foregoing aspects, the apparatus includes a build material delivery system. The system includes a storage means for holding the build material and a conveying means for delivering the build material to the build table. In one embodiment, the storage means includes at least two storage chambers for holding at least two build material components separate from each other and the system further includes a blender for mixing the build material components in a predetermined ratio for delivery to the build table. In addition, the apparatus can include a spreader for distributing the build material over at least a portion of the build table. The spreader can be a counter-rotating roller, and the counter-rotating roller can be skewed with respect to a radius of the rotary build table to induce excess build material to migrate over an edge of the build table.

In additional embodiments, the apparatus can include a sensor disposed below an edge of the build table to detect an amount of the excess build material. An amount of build material delivered to the build table can be adjusted in response to the amount of excess build material detected. In one embodiment, the sensor can automatically monitor printhead condition, and the apparatus can automatically modify its operation in response to a signal from the sensor. In one example, printhead cleaning is initiated if print quality is inadequate. In another example, the apparatus can utilize the redundant printheads in areas where the printing coverage is inadequate.

In other embodiments, the array can include a plurality of printheads disposed above the build table. In one embodiment, the array is configured to dispense fluid at substantially any radial location of the rotary build table without adjustment. In another embodiment, the array prints an entire surface of the build table by continuous consecutive radial scanning motions. In addition, the array can be adjusted incrementally radially and/or can be displaced from a normal printing position for servicing. Further, the array can be displaced radially with respect to the rotary build table. The array can include redundant printheads.

In further embodiments, the apparatus defines an opening for removing the three-dimensional object. In one embodiment, the three-dimensional object is removed through a top opening of the build table. Additionally, the apparatus can include a sensor to monitor at least one performance characteristic of the apparatus, such as print quality, printing errors, print speed, printhead condition, build material quantity, and table position. In one embodiment, the array is movable in response to a signal from the sensor. The apparatus can also include a plurality of rotary build tables.

In still other embodiments, the invention can include methods and apparatus for cleaning the printheads of the apparatus. Methods of cleaning the printhead can include wiping the printhead with a roller including a cleaning fluid, drawing a vibrating member across the printhead, drawing a cleaning fluid across the printhead by capillary action through a wick, and/or combinations thereof. In addition, the methods can include optionally the step of applying a vacuum to the printhead to remove debris. The apparatus for cleaning a printhead used in a 3D printer can include a wick disposed adjacent the printhead for drawing a cleaning fluid across the printhead.

In another aspect, the invention relates to an apparatus for cleaning a printhead used in a 3D printer. The pressure in the interior of a printhead is typically lower than atmospheric pressure. This negative pressure is balanced by the surface tension of the meniscuses that form over the outlets of the printhead nozzles. It is desirable to flush the accumulated powder off the face of the printhead with a clean wash solution without allowing the solution to be drawn into the printhead when the meniscuses are destroyed. This goal is achieved in this apparatus by maintaining an environment outside the printhead in which the pressure is lower than the pressure inside the head. In addition, this induced pressure differential causes binder to flow out of the heads through the nozzles, flushing out any powder that may have lodged in the nozzle passageways. The apparatus includes a base, a cam track disposed within the base, a cap carrier slidably engaged with the cam track, and a sealing cap defining a cavity and disposed on the carrier. The cap being transportable into engagement with the face of the printhead by the carrier. In various embodiments the apparatus includes a cleaning fluid source in communication with the cap for cleaning the printhead face and a vacuum source in communication with the cap for removing used wash fluid and debris.

In further embodiments, the apparatus can also include a spring coupled to the carrier and the base to bias the carrier into a receiving position for receiving the printhead. In one embodiment, the carrier includes a stop disposed on a distal end of the carrier for engaging the printhead as the printhead enters the apparatus. The printhead slides the carrier rearward along the cam track after engaging the stop and until the printhead face and cap sealably engage. In a further embodiment, the apparatus includes a latch pawl coupled to the base for engaging with the carrier to prevent forward movement of the carrier and a squeegee disposed on a proximal end of the carrier. The squeegee is positioned to engage the printhead face as the printhead exits the apparatus.

In still another aspect, the invention relates to a method of cleaning a printhead used in a 3D printer. The method includes the step of receiving the printhead within an apparatus that includes a base, a cam track disposed within the base, a cap carrier slidably engaged with the cam track, and a sealing cap defining a cavity and disposed on the carrier. Additional steps include engaging the face of the printhead with the cap, drawing a vacuum on the cavity, and introducing a cleaning fluid into the cavity and into contact with the printhead face. In one embodiment, the method includes the step of removing the cleaning fluid from the cavity. The method can further include disengaging the cap from the printing surface and wiping the printing surface with a squeegee as the printhead is withdrawn from the apparatus.

In another aspect, the invention relates to an apparatus for cleaning or reconditioning a printhead. The apparatus includes a nozzle array for spraying a washing solution towards a face of a printhead and a wicking member disposed in proximity to the printhead face for removing excess washing solution from the printhead face.

In various embodiments, the nozzle array includes one or more individual nozzles. The wicking member and the printhead are capable of relative movement. A fluid source can also be included in the apparatus for providing washing solution to the nozzle array under pressure. In another embodiment, the wicking member includes at least one of a permeable material and an impermeable material.

The nozzle array can be positioned to spray the washing solution at an angle with respect to the printhead face. In another embodiment, the wicking member is disposed in close proximity to the printhead face, without contacting print nozzles located on the printhead face. The spacing between the wicking member and the print nozzles can be automatically maintained. In one embodiment, the spacing is maintained by causing a portion of the wicking member to bear on the printhead face in a location removed from the print nozzles. The apparatus can also include a basin for collecting washing solution and debris.

In another aspect, the invention relates to a method of cleaning or reconditioning a printhead. The method includes the steps of positioning a face of the printhead relative to at least one nozzle and operating the at least one nozzle to spray washing solution towards the printhead face. Excess washing solution is then removed from the printhead face by passing a wicking member in close proximity to the printhead face, without contacting the printhead face.

In one embodiment, the step of operating the at least one nozzle includes spraying the washing solution at an angle to the printhead face. In another embodiment, the method can include the step of operating the printhead to expel washing solution ingested by the printhead during cleaning. The method can include automatically maintaining a space between the wicking member and print nozzles located on the printhead face by, for example, causing a portion of the wicking member to bear on the printhead face in a location removed from the print nozzles.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In addition, the drawings are not necessarily to scale, emphasis instead generally being placed upon illustrating the principles of the invention. In the following description, various embodiments of the present invention are described with reference to the following drawings, in which:

FIG. 5A is a schematic partial cross-sectional view of the apparatus of FIG. 1 taken at line 5A-5A in FIG. 4;

FIG. 5B is an enlarged schematic perspective view of an overflow sensor in accordance with the invention;

FIG. 8A is an enlarged schematic perspective of one embodiment of a printbar assembly including a print diagnostic station in accordance with the invention;

FIG. 8B is a schematic representation of the diagnostic station of FIG. 8A;

FIGS. 9A-9J are schematic representations of one embodiment of an apparatus and method for cleaning a printhead in accordance with the invention;

FIG. 10 is a schematic representation of one step of the method of cleaning a printhead depicted in FIGS. 9A-9J;

FIGS. 12A-12C are schematic side and perspective views of a printhead being cleaned at the cleaning station of FIG. 11;

FIGS. 14A-14D are schematic representations of one embodiment of a radial printing process in accordance with the invention.

DETAILED DESCRIPTION

Embodiments of the present invention are described below. It is, however, expressly noted that the present invention is not limited to these embodiments, but rather the intention is that variations, modifications, and equivalents that are apparent to the person skilled in the art are also included.

Figure 1:
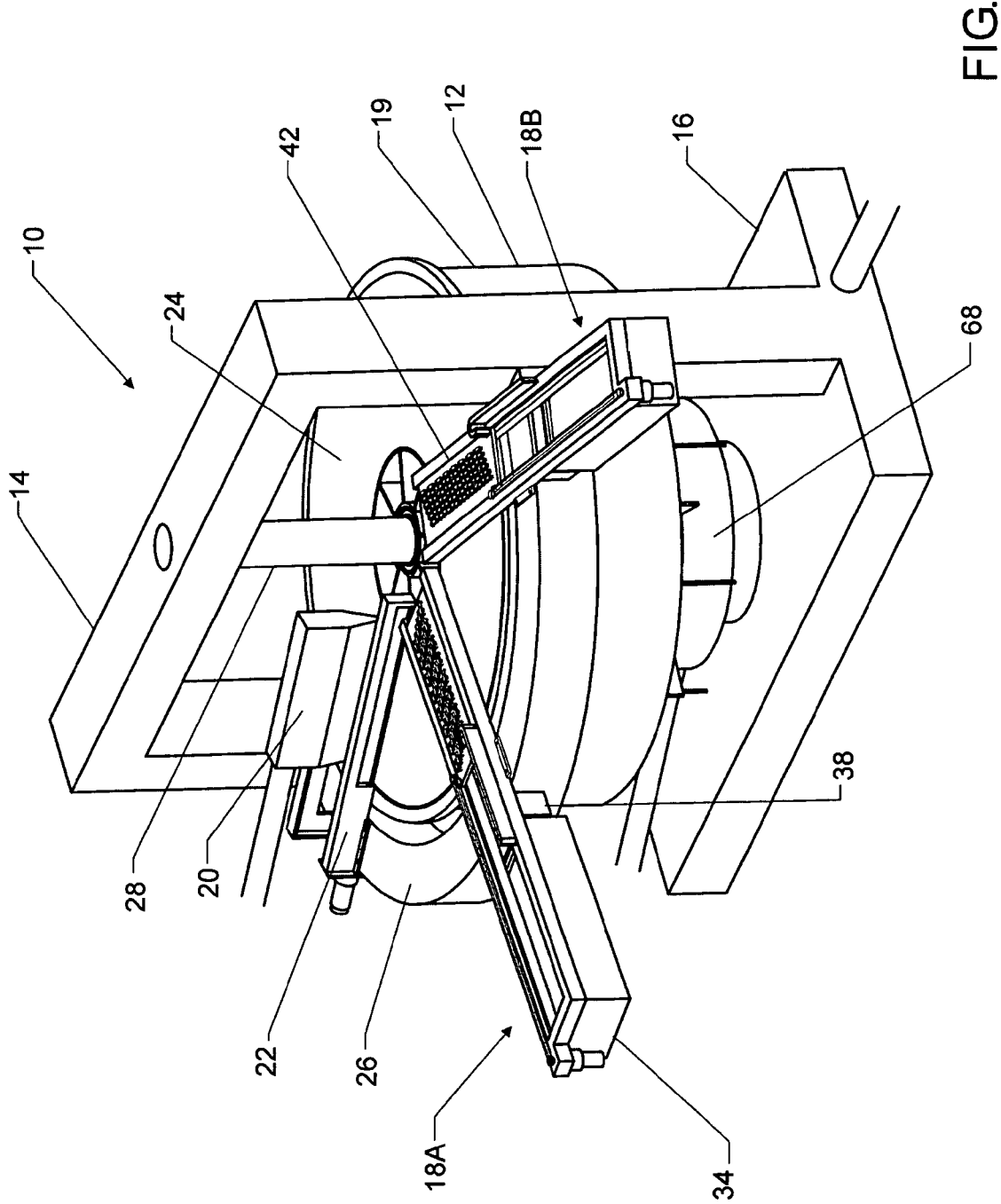
FIG. 1 is a schematic top perspective view of one embodiment of an apparatus for 3D printing in accordance with the invention.
Figure 2:
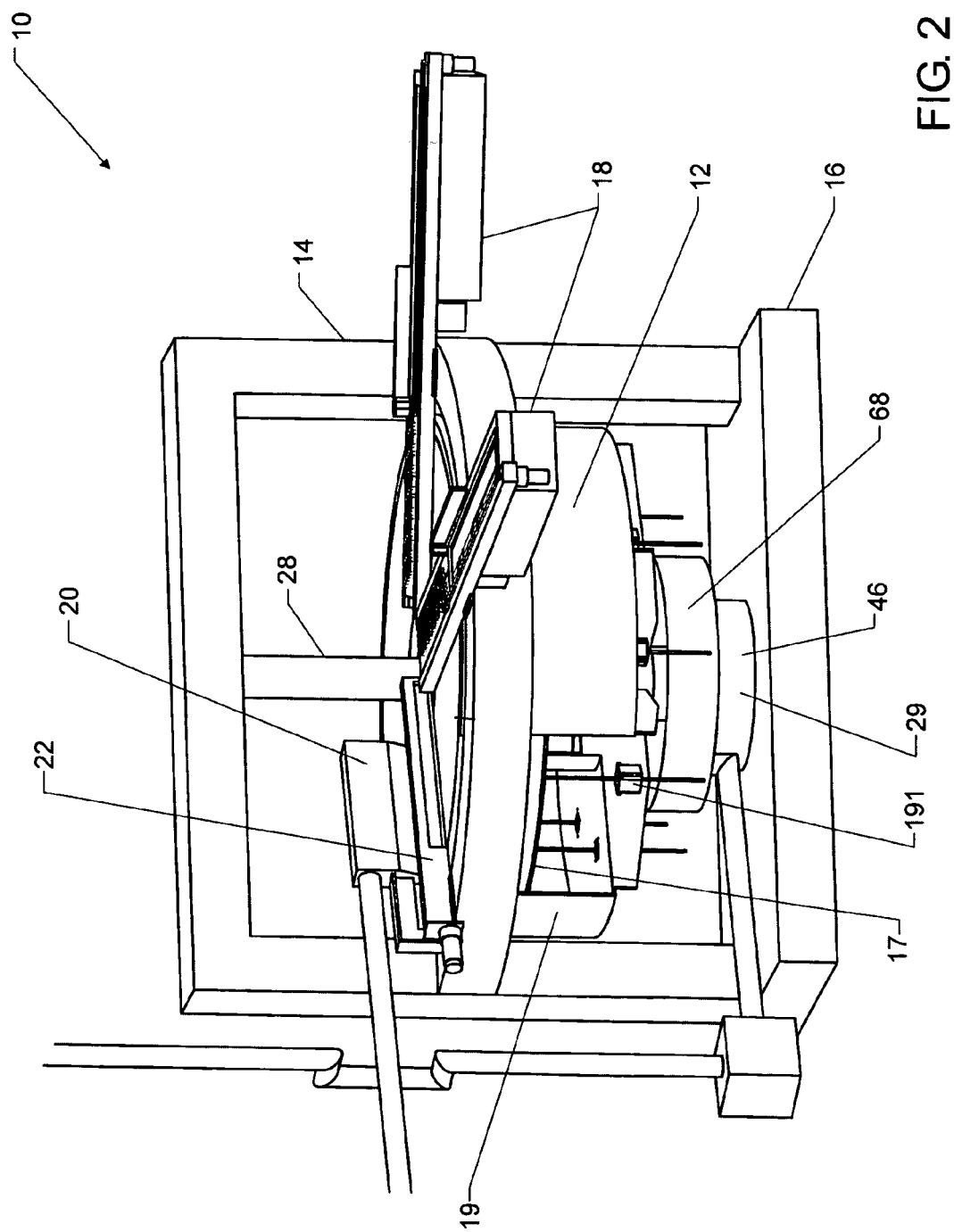
FIG. 2 is an enlarged schematic side perspective view of the apparatus of FIG. 1.
Figure 3:
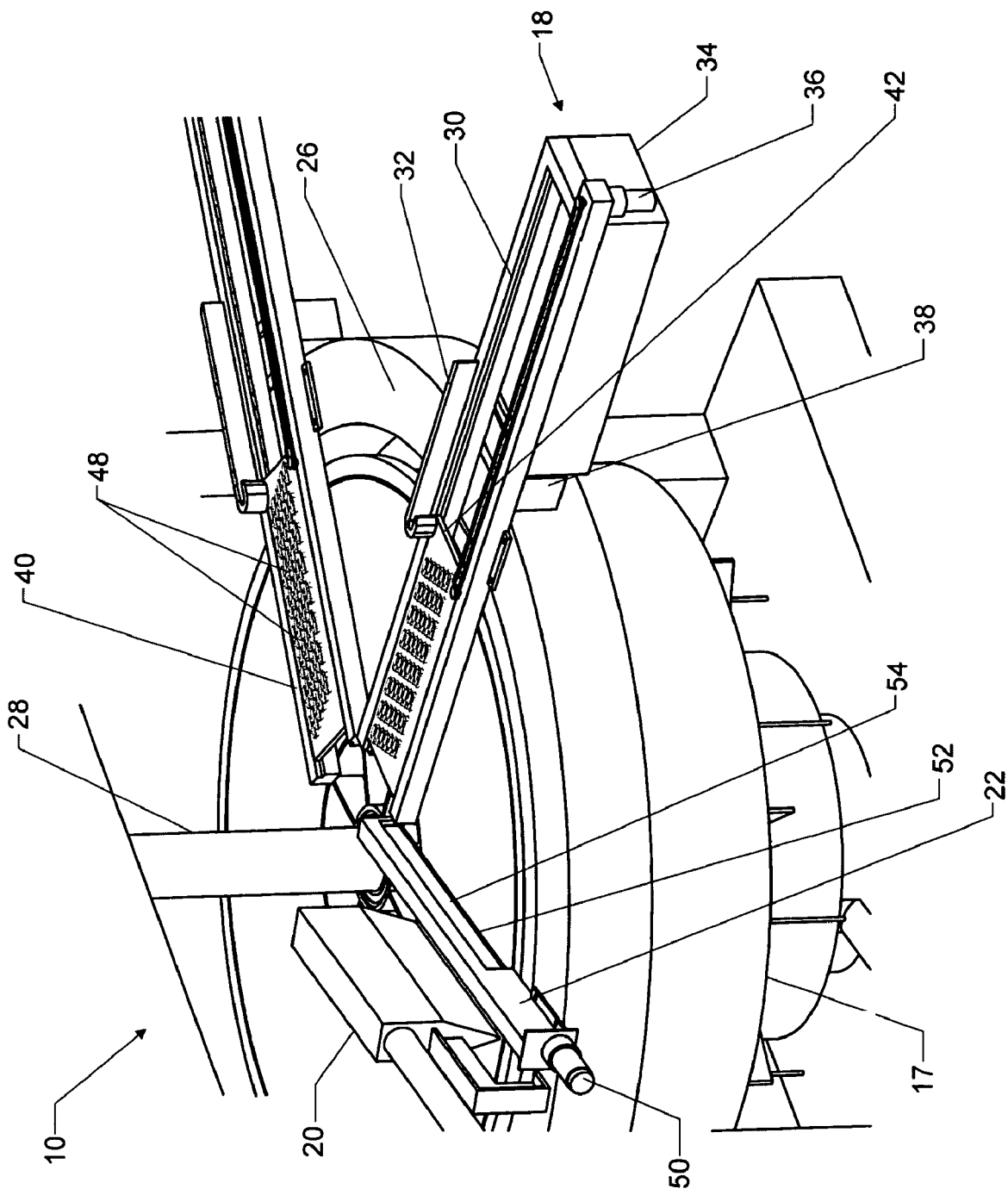
FIG. 3 is an enlarged schematic perspective view of a portion of the apparatus of FIG. 1.

FIGS. 1-3 depict an apparatus 10 for 3D printing. The apparatus 10 produces three-dimensional objects by depositing alternating layers of build material and binder on a build surface or in a container to print multiple layers that ultimately form the three-dimensional object. The apparatus 10 includes a rotary build table, in this case a build drum 12, a structural frame 14, a base 16, at least one printbar assembly 18, a powdered build material dispenser assembly 20, and a spreader assembly 22. In the embodiment shown, the apparatus 10 includes two printbar assemblies 18A, 18B. The apparatus 10 further includes a component-mounting surface 26 attached to the frame 14. In one embodiment, the component mounting surface 26 may be movable to provide access to the build drum 12. The various assemblies 18, 20, 22 are typically mounted to the component mounting surface 26 and/or the frame 14. It is generally advantageous, for maintenance purposes, for the assemblies 18, 20, 22 to be stationary and the build drum 12 to rotate. For example, with redundant stationary printbar assemblies 18, a user can change out one printbar assembly 18 while the other printbar assembly 18 continues to operate. In addition, the apparatus 10 can include essentially any number of printbar assemblies 18 mounted in a variety of configurations for accomplishing printhead redundancy, increasing print speeds, and/or printing multiple colors.

The build drum 12 shown is generally cylindrical in shape and is mounted about a center shaft 28 attached to the base 16 and the frame 14. A bottom surface 17 of the build drum 12 may be substantially perpendicular to a sidewall 19 of the build drum 12, or the bottom surface 17 can be angled. For example, the bottom surface 17 may be conical, such that the surface tilts toward a center point of the build drum 12. The tilt may be from about 1 degree to about 15 degrees or more. In such an arrangement, the dispenser, the spreader, and the printbars should be slanted to correspond to the angle of tilt.

In a particular embodiment, the build drum 12 is mounted on a rotary actuator 29 that rotates the build drum 12 about the center shaft 28. The rotary actuator 29 could be hydraulically, pneumatically, or electrically driven. The rotary actuator 29 can include gears and belts for driving the build drum 12. In addition, the rotary actuator 29 may include one or more encoders 46, or similar devices, that cooperate with a controller to monitor and adjust the speed and/or position of the build drum 12. The encoders 46 can also be used to control the firing of the printheads 48, such that the printheads 48 print accurately and repeatedly, regardless of variations in the rotational speed of the build drum 12.

The build drum 12 receives build material from the build material dispenser assembly 20 that is located adjacent to the build drum 12. In particular, the build material dispenser assembly 20 is mounted above the build drum 12 and dispenses build material onto the build drum 12 as it rotates. Typically, the build material dispenser assembly 20 deposits a predetermined amount of material onto the build drum 12 in the form of a line substantially along a radius of the build drum 12. Alternatively, the build material dispenser assembly 20 could include nozzles for spraying the material onto the build drum 12. In addition, the build material dispenser assembly 20 could include a volumetric adjuster, for manually or automatically adjusting the amount of material being deposited. The build material dispenser assembly 20 is supported on the component-mounting surface 26. In one embodiment, the build material dispenser assembly 20 may be supplied by a larger dispenser assembly located remotely from the apparatus 10 (see FIGS. 6A and 6B). Further, the build material dispenser assembly 20 may include an agitator to maintain the build material in a loose powder form.

Located adjacent the build material dispenser assembly 20 is the spreader assembly 22. The spreader assembly 22 spreads the build material uniformly across the build drum 12 as it rotates. The spreader assembly 22 is shown in greater detail in FIG. 3. The spreader assembly 22 includes a counter-rotating spreader roll 52 that spreads the build material radially across the build drum 12, thereby forming a build surface 24. The spreader assembly 22 also includes a roll scraper 54 that removes build material that may become stuck to the roll 52. The spreader assembly 22 is also mounted on the component-mounting surface 26.

The operation of the build drum 12 varies in different embodiments to accommodate the multiple layers of build material. For example, in one embodiment, the build drum 12 moves downwardly relative to the assemblies 18, 20, 22 mounted on the component mounting surface 26. In a particular embodiment, at least a portion of the center shaft 28 and the build drum 12 are threaded and the build drum 12 threadedly engages the center shaft 28. As the build drum 12 rotates, it moves down the center shaft 28. In another embodiment, as shown in FIGS. 2 and 5A, the build drum 12 includes a bottom surface 17 that moves downwardly relative to the build drum 12 to continuously receive layers of build material. The bottom surface 17 is moved vertically by one or more linear actuators 191. The linear actuators could be hydraulically, pneumatically, or electrically driven. In yet another embodiment, the assemblies 18, 20, 22 move upwardly relative to the build drum 12 and the build surface 24.

It is advantageous for a user to be able to remove finished parts without stopping the printing process, therefore, the build drum 12 may include structure for facilitating removal of completed parts. In one example, the build drum 12 includes an opening in its bottom or side surface that allows for removal of the parts from the bottom and/or side, while the apparatus 10 continues to print above. In this example, the apparatus 10 may print a bottom plate covering essentially the entire build surface 24 before printing any parts. The bottom plate(s) would separate the layers of printed parts to prevent the inadvertent removal of build material or unfinished parts. Alternatively, the user could stop the printing process and remove the parts manually from the top, bottom, or side (see FIGS. 7A and 7B).

Figure 4:
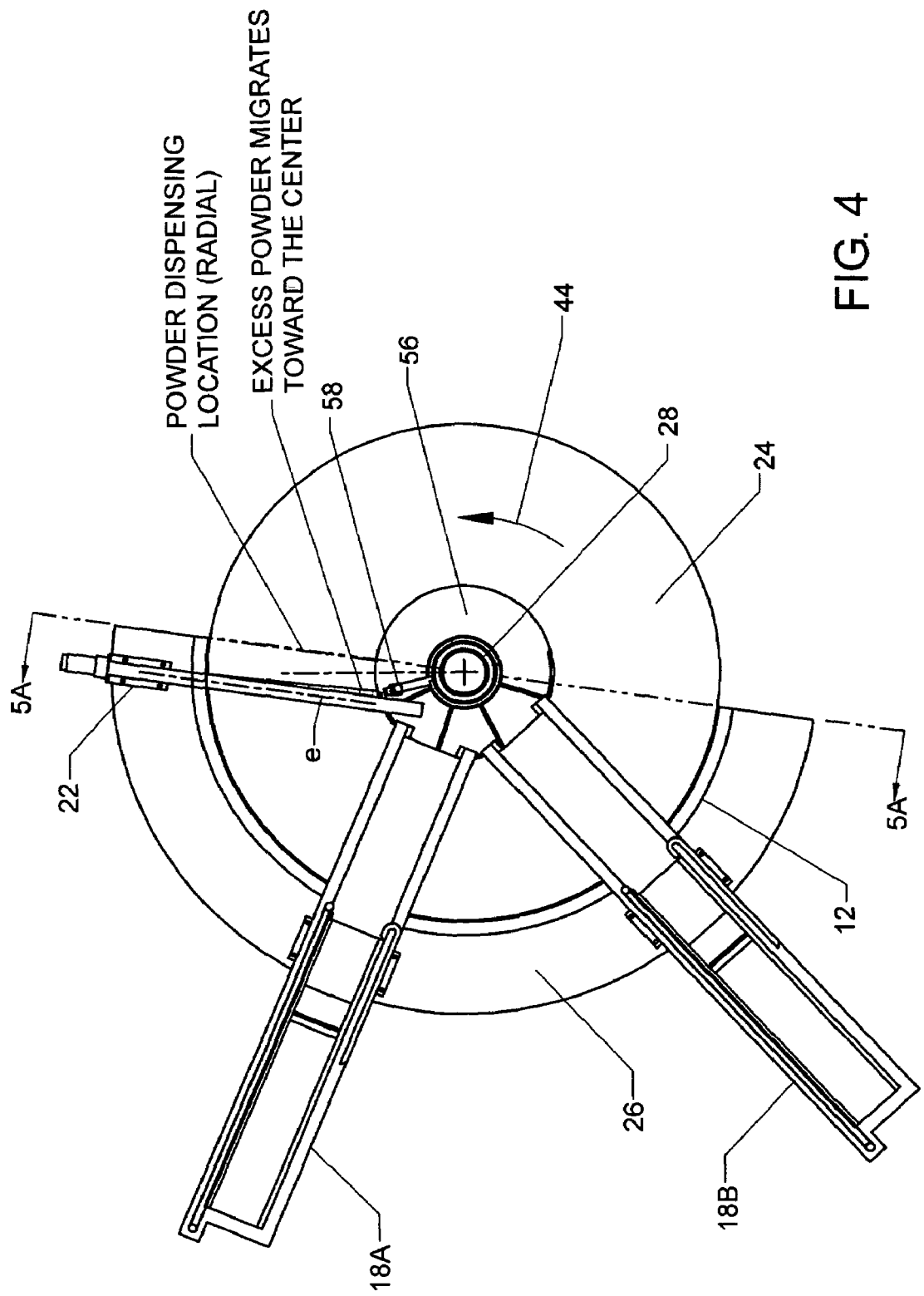
FIG. 4 is a schematic top view of the apparatus of FIG. 1 illustrating the spreader apparatus.

As shown in FIG. 4, the spreader assembly 22 is disposed slightly non-radially, with respect to the build drum 12. The build material dispenser assembly 20 deposits a substantially radial line of material in front of the spreader assembly 22 as the build drum 12 rotates (arrow 44). The apparatus 10 can be configured to operate with the drum 12 rotating in a counter-clockwise direction when viewed from the top as illustrated or clockwise in a mirror image of the configuration shown. The non-radial spreader assembly 22 spreads the material, forcing the excess material to migrate towards a center opening 56 in the build drum 12. The excess material falls into an overflow tray 68 (see FIGS. 1-2) located beneath the build drum 12. In one embodiment, the apparatus 10 is configured to reclaim the excess material for later use. In the embodiment shown, the apparatus 10 includes an overflow sensor 58. The sensor 58 monitors the amount of excess material falling through the center opening 56. The sensor 58 sends a signal to the apparatus controller indicative of the amount of excess material measured. The apparatus 10 can, in response to the signal, adjust the amount of material dispensed by the build material dispenser assembly 20.

The sensor 58 is shown in greater detail in FIGS. 5A and 5B. FIG. 5A depicts the general location of the sensor 58 on the apparatus 10. The sensor 58 is disposed within the center opening 56 and is mounted to the non-rotating center shaft 28. FIG. 5B is an enlarged view of the sensor 58. The sensor 58 includes a shaft 66 for mounting the sensor 58 to the center shaft 28. At a distal end of the shaft 66 is a paddle-wheel assembly including a magnetic sensor 60 and a series of magnets 62 located on individual legs 64 of the paddle-wheel 65. As excess material falls, it impinges on the legs 64, causing the paddle wheel 65 to rotate. The speed and/or period of rotation can be used to ascertain the amount of excess material being deposited, which can be adjusted accordingly. Alternatively, other types of sensors or more than one sensor can be used.

Referring back to FIGS. 1-3, two printbar assemblies 18A, 18B are shown disposed about the apparatus 10. Each printbar assembly 18 includes a printhead carrier 42, for carrying at least one printhead 48, a service station 34, a printhead diagnostics station 38, a printbar motor 36, a printbar cable guide 32, and a printbar slide 30. One of the two assemblies 18A, 18B can be redundant to the other. Alternatively, many more printbar assemblies 18 could be included on the apparatus 10. The printbar cable guide 32 guides and secures the electrical connections to the printheads 48. The printbar slide 30 is attached to the component-mounting surface 26 and supports the printhead carrier 42, the service station 34, the printhead diagnostics station 38, and the printbar motor 36. The print bar motor 36 can be a servo type motor, used to radially move the printbar assembly 18 relative to the build drum 12 along the slide 30. It is generally advantageous to use a positioning system capable of accurate and repeatable control, because this directly influences the accuracy of the objects being produced. The printhead carrier 42 is radially movable to position the printheads 48 for printing and for performing service on the printheads 48.

The printhead carrier 42 can be moved along a radius of the build drum 12 to correct for deficiencies in print quality. For example, the printhead carrier 42 supports a printhead array 40, which may include any number of printheads 48, for example a single printhead 48 or eight rows of six printheads 48. The printhead array 40 may include redundant printheads 48, which compensate for the deficiencies in print quality. The printheads 48 can be commercially available inkjet type printheads or custom manufactured printheads to suit a particular application. The printheads 48 include multiple jets, for example 512 jets, each jet for depositing a drop of binder onto the build surface 24.

The printheads 48 can be moved incrementally back and forth along the radius in a "shingling" fashion to compensate for irregularities in printing, for example, if some jets are not working, misfire, or are out of alignment. Shingling allows the apparatus 10 to produce stronger parts, because printing errors are averaged out. For example, shingling reduces the affect of jets that are not printing properly by offsetting the jets by a small amount such that any line of unprinted build material caused by a missing jet is in a different location on each print layer. Shingling can be carried out in various ways, for example, in response to an error message or the apparatus 10 can be programmed to continuously shingle by moving the printheads 48 in and out along the radius a random distance between the printing of each layer. Alternatively, the apparatus 10 can be programmed to run a printing routine, where the printheads 48 are moved a set distance for a specific number of print layers and then reset to a starting position. For example, the printheads 48 can be moved out along the radius 1/16" for each print layer until the printheads 48 have been moved a total of 1/4". Then, the printheads 48 can be moved back in along the radius to their starting position or be moved back incrementally. Therefore, the apparatus 10 is printing over the same areas with different printheads 48 to average out any errors.

Figure 14A:
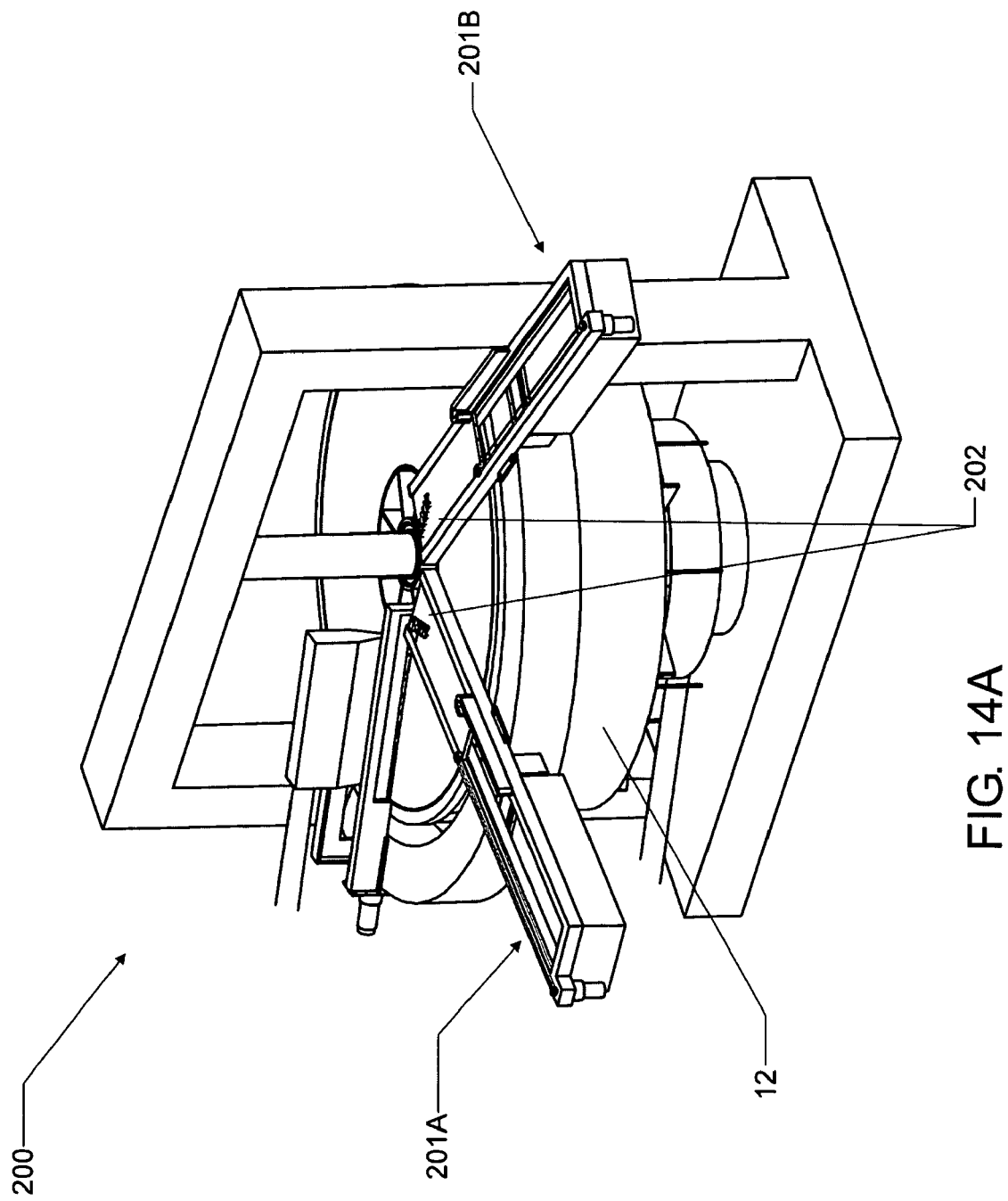
Figure 14B:
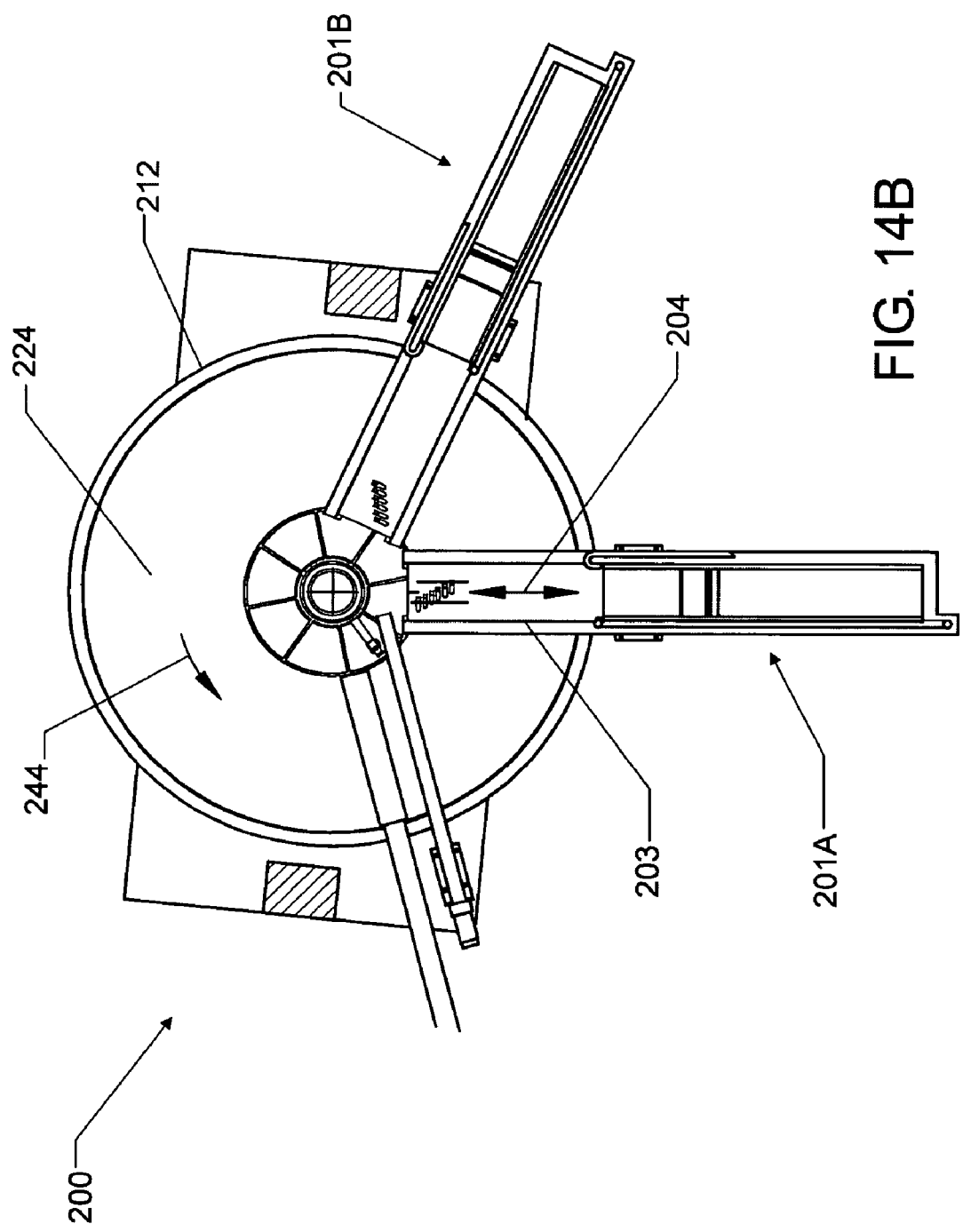

FIGS. 14A-14D depict generally a radial scanning print process, where a printhead array moves continuously in and out along a radius of a build drum, as the build drum rotates continuously. In such a process, the printhead array scans an entire build surface of the 3D printer. FIG. 14A is a schematic isometric view of a 3D printer 200 in accordance with the invention. The 3D printer 200 is similar to the 3D printer 10 previously described with respect to FIGS. 1-3. The 3D printer 200 includes a build drum 212 and two printbar assemblies 201A, 201B. Each printbar assembly 201A, 201B includes a printhead array 202. FIG. 14B is a schematic top view of the 3D printer 200 of FIG. 14A. The printbar assemblies 201A, 201B include printhead carriers 203 that move in and out, generally along a radius of the build drum 212, as shown by arrow 204. As shown in FIG. 14B, the build drum 212 includes a build surface 224 and rotates counter-clockwise, as shown by arrow 244. Generally, the build drum 212 moves relatively slowly, while the printhead carriers 203 move more rapidly.

FIGS. 14C and 14D are enlarged schematic top views of the 3D printer 200 of FIG. 14A. As shown in FIG. 14C, the printhead array 202 includes six printheads 248 staggered along a length of the printhead carrier 203; however, the array 202 could be made up of essentially any number or arrangement of printheads 248. The six staggered printheads 248 define the printing swath width 206. In one embodiment, each printhead 248 prints a 1/2" swath, resulting in a swath width 206 of about 3". The width 206 is obtained with all of the jets printing; however, different swath widths and shapes can be achieved by controlling the number and arrangement of jets that actually fire. As the printhead carrier 203 moves the printhead array 202 radially in and out, the printheads 248 print on the in stroke, as shown by arrow 205.

FIG. 14D depicts the specific details of the print swaths. Generally, the swaths print canted to a radius of the build drum 212, because the build drum 212 is rotating as the printheads 248 are printing along the radius. The printhead travel path 207 includes a print stroke 208 and a return stroke 209 (the lines shown represent the centerline of the printhead array 202). The return stroke 209 occurs as the printhead carrier 203 moves radially outward, and the print stroke 208 occurs as the printhead carrier 203 moves radially inward. When printing, not all of the jets are firing along the entire print stroke 208, resulting in a used printable area 213 and an unused printable area 211. This is done to compensate for the fact that the printed swaths would otherwise overlap as the build drum 212 rotates. As shown, the printed segments 210 abut one another, thereby forming a fully printed area, as shown. The used printable area 213 of the swath is widest at a point furthest from the center of the build drum 212.

It should be noted that the various 3D printers disclosed herein print based on polar coordinates (i.e., r, θ), as opposed to linear printers, which print based on rectangular coordinates (i.e., x, y). The disclosed 3D printers include logic for converting rectangular coordinates to polar coordinates for printing on a radial build surface. The converting logic typically resides in the controller that controls the operation of the 3D printer.

In addition, because the printheads are printing along a radius, not all of the jets of the printhead print every time. In particular, the jets located closest to the center of the print arrays tend to print less, thereby resulting in a longer duty life. Correspondingly, the printheads located on the outsides of the print arrays tend to fail first.

In one embodiment, the apparatus 10 can include one or more sensors to measure the print quality or other characteristics of the apparatus 10, such as print speed, printhead condition (e.g., an empty or dirty printhead), misfiring jets, build material quantity, and/or build drum position. In a particular embodiment, a sensor can monitor the print quality by determining if the printheads 48 are printing properly and, if not, can send a signal to the apparatus controller to shift the printheads 48 to compensate for printheads 48 that are not printing properly. For example, the controller could move the printheads 48 radially a very small amount for shingling purposes. In one embodiment, a sensor can be used to determine whether all, or at least a minimum number, of jets are firing and, if not, signal the user to replace a printhead 48. Additionally, sensors can be used to monitor and control other functions, such as running diagnostic tests, performing cleaning of the printheads 48, refilling the build material dispenser assembly 20, cleaning the spreader assembly 22, and performing any other desired function of the apparatus 10.

The printbar assembly 18 can also be moved for diagnostic or service purposes. Moving the printhead array 40 radially from the build drum 12 provides the user with access to the printheads 48 for maintenance purposes, such as cleaning or replacement. Printhead cleaning is described in detail with respect to FIGS. 9A-9J, 10, 11, 12A-12C, and 13A-13D. The printhead array 40 can also be moved radially outwardly to run a diagnostic routine of the printhead array 40 (see FIGS. 8A and 8B). In an alternative embodiment, the printbar assembly 18 can be raised from the build drum 12 for service purposes.

The size and exact configuration of the apparatus 10 can vary to suit a particular application. For example, the apparatus 10 could be sized to fit on a tabletop to produce relatively small three-dimensional objects, or the apparatus 10 could have a substantial footprint for producing relatively large three-dimensional objects. In a particular embodiment, the build drum 12 has an outside diameter of about six feet, an inside diameter of about two feet, and a depth of about two feet. The size of the build drum 12 can vary to suit a particular application. In addition, the apparatus 10 can be situated within an enclosure and can include air handling equipment for cleaning the work environment. The enclosure can include windows for monitoring operation of the apparatus 10.

Additionally, the apparatus 10 may include multiple build drums 12 and printbar assemblies 18. In one possible configuration, the apparatus 10 includes multiple build drums 12 spaced about a centrally located gantry that carries the printing components, i.e., material dispenser, spreader, and the printheads. The gantry can be rotated into position above one of the build drums 12. In this configuration, the user can be printing on one build drum 12 while removing parts from another build drum 12, thereby allowing for continuous operation. In another embodiment, the build drum 12 can be radially stationary, but vertically movable. In this embodiment, the printing components are configured to move radially about the build drum 12. In a particular embodiment, the gantry supporting the printing components rotates radially about the build drum 12 while the printheads move back and forth along a radius of the build drum 12. This configuration allows for printing over substantially the entire surface area of the build drum 12.

Figures 15A, 15B:
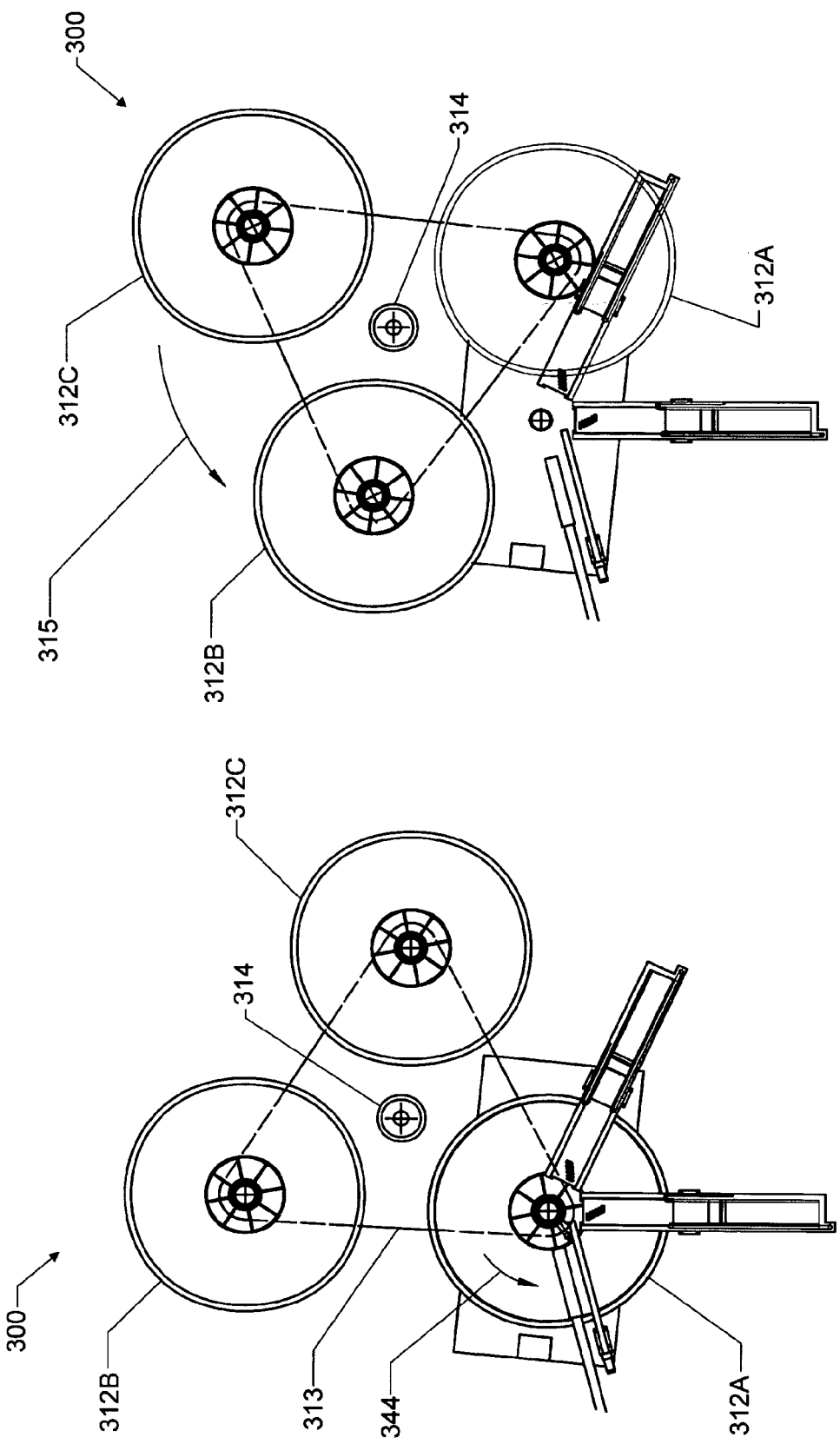
FIGS. 15A and 15B are schematic top views of an alternative embodiment of an apparatus for 3D printing in accordance with the invention.

FIGS. 15A and 15B depict an alternative embodiment of a 3D printing apparatus 300 in accordance with the invention. As shown in FIG. 15A, the apparatus 300 includes three build drums 312 disposed on a carousel 313. The printing hardware is stationary as the carousel 313 rotates the build drums 312 around a carousel pivot shaft 314 into alignment with the printing hardware. The build drums 312 and printing hardware are essentially the same as previously described.

FIG. 15B depicts the carousel 313 rotating counter-clockwise (arrow 315) to move one build drum 312A out of alignment with the printing hardware and a second build drum 312B into alignment with the printing hardware. The carousel can rotate in either the clockwise or counter-clockwise direction. One advantage to this arrangement is that the apparatus 300 can be printing on one build drum 312C, while one set of printed objects can be curing in the second build drum 312B and another set of printed objects are being removed from the third build drum 312A.

Figure 6A:
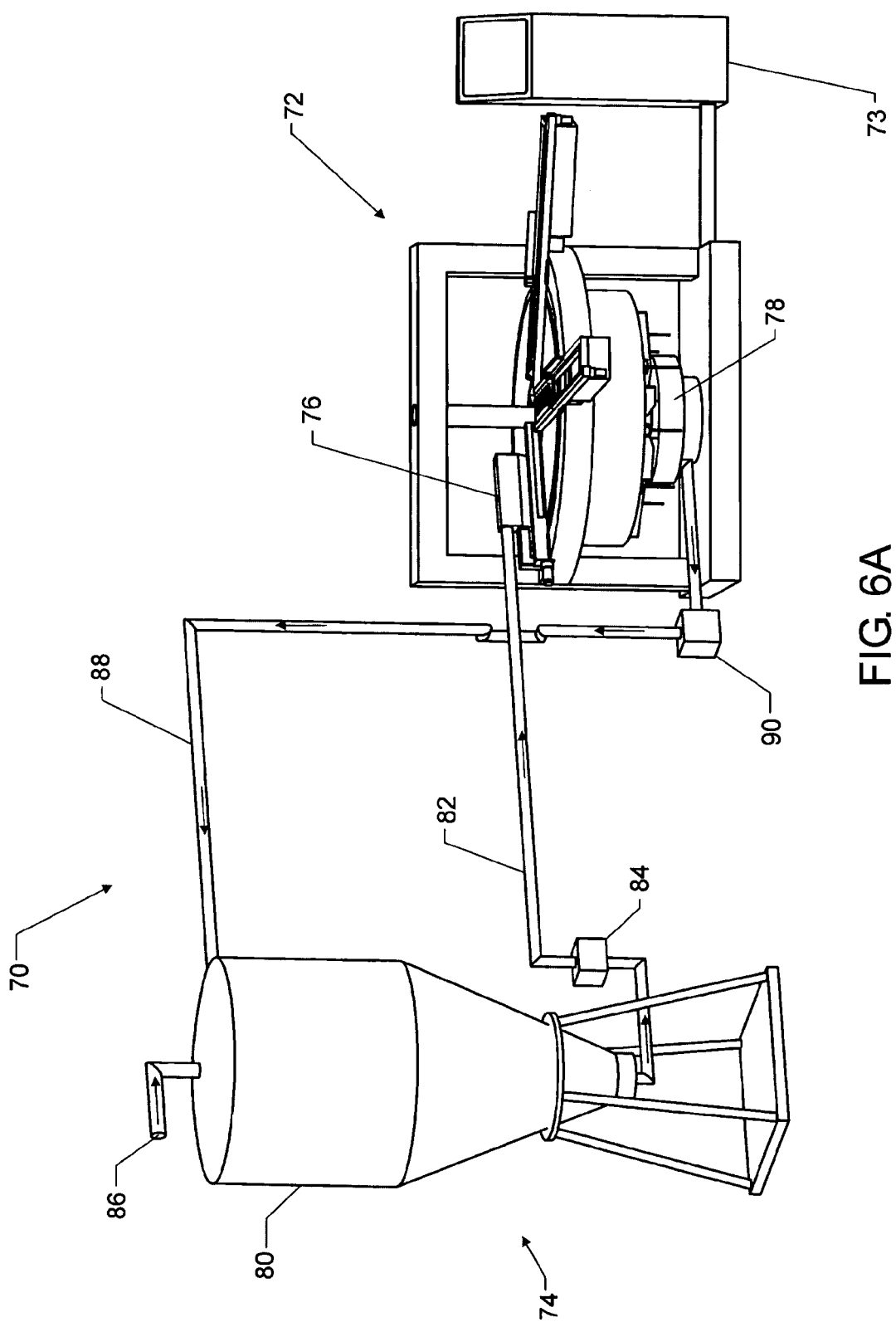
FIG. 6A is a schematic perspective view of one embodiment of a system for 3D printing including a 3D printing apparatus and a build material delivery system in accordance with the invention.
Figure 6B:
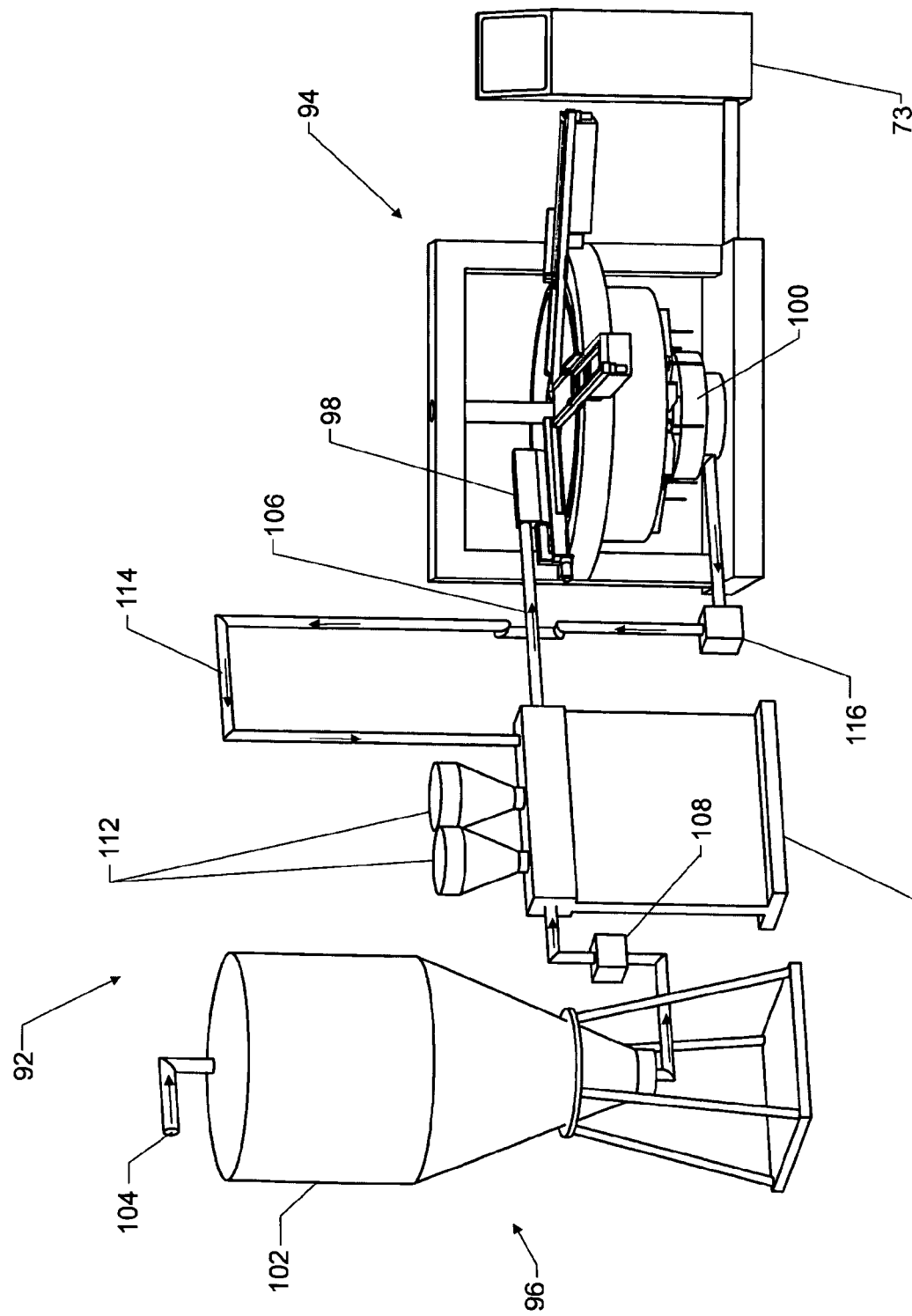
FIG. 6B is a schematic perspective view of an alternative embodiment of a system for 3D printing including a 3D printing apparatus and a build material delivery system in accordance with the invention.

FIGS. 6A and 6B depict systems 70, 92 for 3D printing utilizing two different build material feed systems 74, 96. Referring to FIG. 6A, the system 70 includes a 3D printing apparatus 72, similar to that previously described with respect to FIGS. 1-3, and the build material feed system 74 remotely connected to the 3D printing apparatus 72. The build material feed system 74 includes a storage bin, or hopper 80, for holding the build material and structure for conveying the build material to the 3D printing apparatus 72. The hopper 80 may include multiple internal compartments for holding multiple build material components that are mixed before being conveyed to the three-dimensional printing apparatus 72. Additionally, the multiple compartments might hold different types of build materials, with the build material feed system 74 including structure for delivering one or more different materials to the apparatus 72.

The build material feed system 74 shown in FIG. 6A includes a supply duct 82, a supply pump 84, a return (or overflow) duct 88, and a return (or overflow) pump 90. These components 82, 84, 88, 90 connect the hopper 80 with the 3D printing apparatus 72 and are capable of conveying a continuous or intermittent flow of material to the 3D printing apparatus 72, as needed. The ducts 82, 88 can be rigid or flexible or combinations thereof. For example, a flexible hose can be used at the connection points between the ducts 82, 88 and the 3D printing apparatus 72, while the portion of the ducts 82, 88 running between the build material feed system 74 and the 3D printing apparatus 72 can be rigid pipe. In alternative embodiments, the build material feed system 74 could include a conveyer belt system, a carousel, a feed screw, a gravity feed system, or other known components for transporting loose powder materials. The systems could be operated manually or driven pneumatically, hydraulically, or electrically. Additionally, the build material feed system 74 may include a main fill port or duct 86 on the hopper 80. Further, the build material feed system 74 may include one or more sensors connected to the controller 73 to monitor and control material levels in the hopper 80 and/or the amount and the rate of the materials being delivered to the 3D printing apparatus 72.

The hopper 80 is filled with build material, typically in powder form, via the duct 86. Alternatively, the hopper 80 may include a removable cover for filling. The material is directly fed to the 3D printing apparatus 72 via the supply duct 82 exiting the bottom of the hopper 80. The supply pump 84 is located in the supply duct 82 to facilitate transportation of the material to a build material dispenser assembly 76 on the 3D printing apparatus 72. In the embodiment shown, the excess material is collected in a material overflow tray 78 located on the 3D printing apparatus 72 and returned directly to the hopper 80 via the return duct 88 and the return pump 90 located in the return duct 88. The material is returned to the top of the hopper 80. In an alternative embodiment, the return material is processed before being returned to the hopper 80. In a particular embodiment, the build material feed system 74 may include an agitation component to maintain the build material in a powder form. Alternatively or additionally, the build material feed system 74 may include components for handling build materials supplied in other than powder form.

As shown in FIG. 6B, the system 92 includes a 3D printing apparatus 94, similar to that previously described with respect to FIGS. 1-3, and the build material feed system 96 remotely connected to the 3D printing apparatus 94. The build material feed system 96 is similar to the system 74 described with respect to FIG. 6A and includes a hopper 102, a supply duct 106, a supply pump 108, a return (or overflow) duct 114, and a return (or overflow) pump 116. The build material feed system 96 further includes a blending assembly 110. In the embodiment shown, the blending assembly 110 is disposed in the supply duct feeding the 3D printing apparatus 94; however, the blending assembly 110 could be located in the hopper 102 to blend the materials before they leave the hopper 102.

The blending assembly 110 includes multiple component hoppers 112. In this configuration, the main hopper 102 holds one or more of the major constituents of the build material that are supplied to the blending assembly 110, such as sand. One or more additional constituents are introduced to the blending assembly 110 via the component hoppers 112. The blending assembly 110 controls the feed rate and blending of the various constituents to create the final build material. Additionally, the blending assembly 110 can blend the excess material received from the return duct 114 into the build material supplied to the 3D printing apparatus 94. In a particular embodiment, the blending assembly 110 meters the excess material into the blended build material in such a manner as to not effect the quality of the material being delivered to the 3D printing apparatus 94.

Figure 7A:
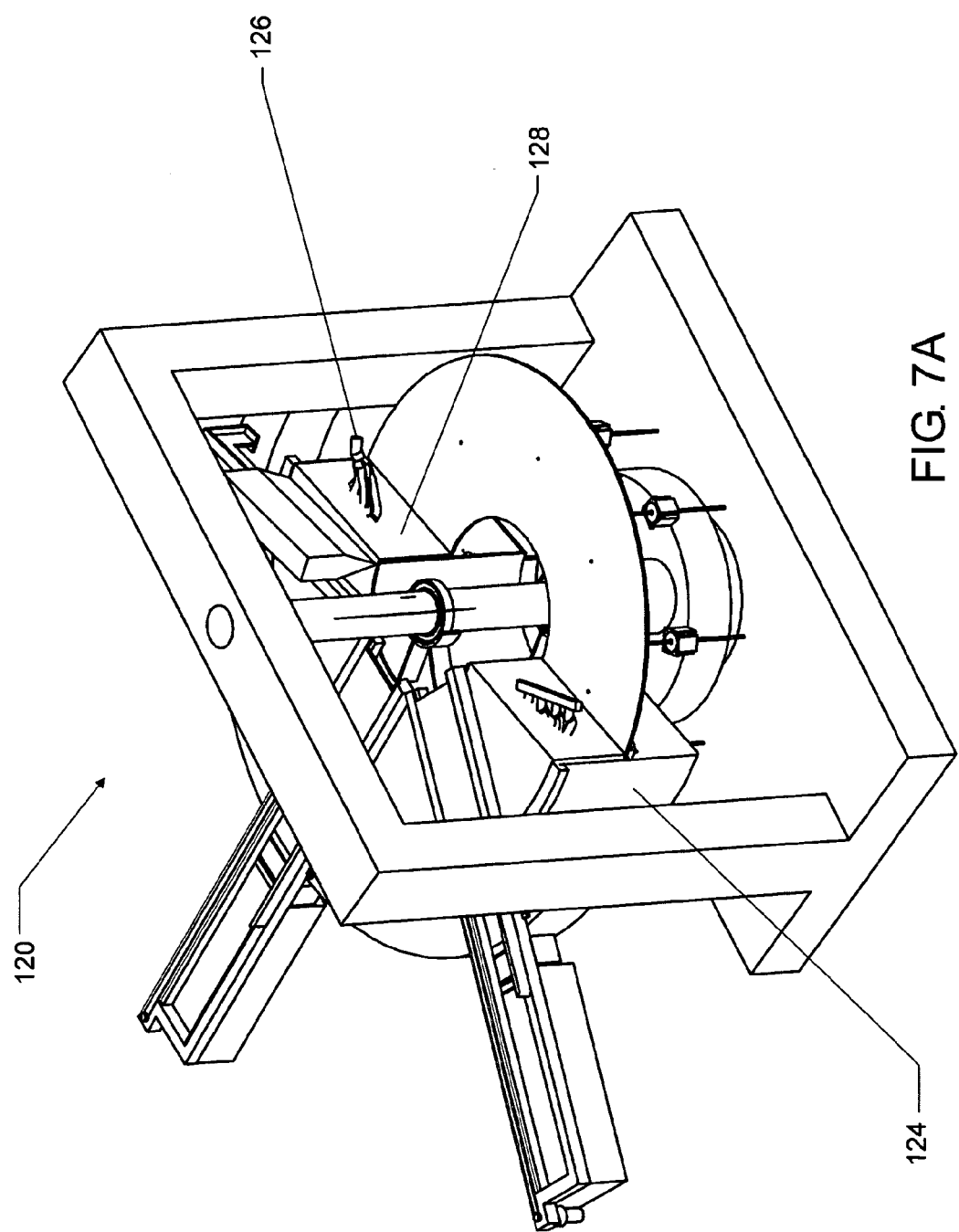
FIG. 7A is a schematic perspective view of one embodiment of an apparatus for 3D printing in accordance with the invention with a build drum partially cut-away.
Figure 7B:
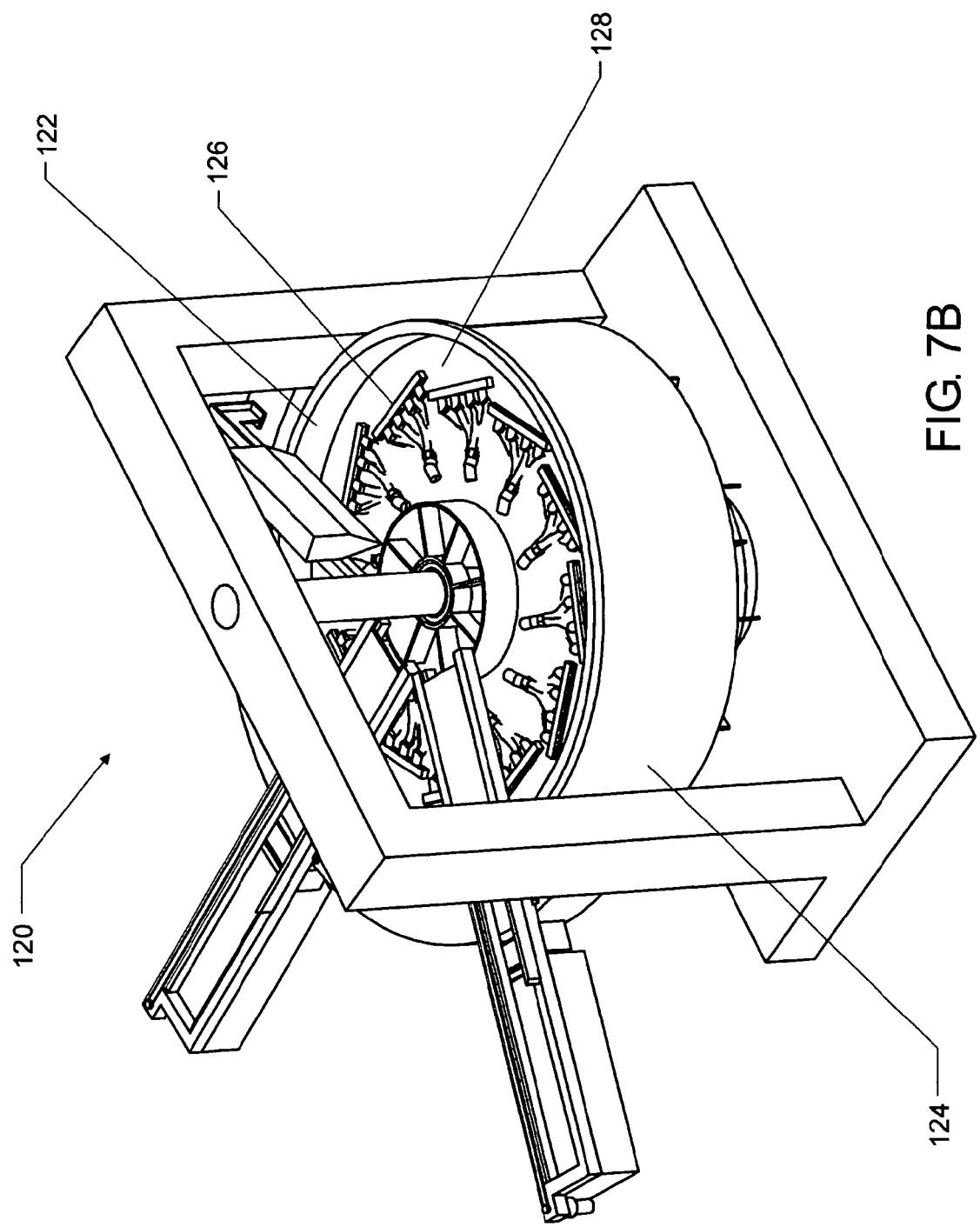
FIG. 7B is a schematic perspective view of the apparatus of FIG. 7A with a portion of the build material removed from the build drum.

FIGS. 7A and 7B depict the removal of three-dimensional objects or printed parts 126 from one embodiment of a 3D printing apparatus 120 in accordance with the invention. In FIG. 7A, the build drum 124 is shown in partial section to illustrate the positioning of the printed parts 126. Layers of the build material accumulate in the build drum 124 and the printed parts 126 are surrounded by non-printed (unbound) build material 128. There are various ways of removing the parts 126; however, in the embodiment shown, the parts 126 are removed though a top opening 122 of the build drum 124. Specifically, the unbound build material 128 is evacuated from the build drum 124 by, for example, vacuuming. Alternatively, the unbound material 128 could be drained through bottom or side openings in the build drum 124. Once the unbound material 128 is removed, the parts 126 can be manually or automatically removed from the build drum 124. In one embodiment, the top opening 122 is partially covered. The parts 126 may be further processed, as needed.

FIGS. 8A and 8B illustrate the diagnostic station 38 of FIG. 1. Other diagnostic systems are possible; for example detecting drops of binder or printing a test pattern on the build material. The diagnostic station 38, as shown in detail in FIG. 8B, includes chart paper 130 mounted between a paper supply roll 132 and a paper take-up roll 134, an optical scanner 138, a fixed reference printhead 140, and a paper drive capstan 136. The capstan 136 is used to accurately feed and position the chart paper 130. To run a diagnostic test, a portion of the printhead array 40 is moved in position over the diagnostic station 38 (arrow 142 in FIG. 8A). A clean section of chart paper 130 is positioned below the printhead array 40 (arrow 144 in FIG. 8A). The printheads 48, including the reference printhead 140, print on the chart paper 130. The printed test pattern is passed under the optical scanner 138 for analysis. In one embodiment, the optical scanner 138 is a CCD camera that reads the test image. The apparatus controller 73, via the diagnostic station 38, is able to determine if the printheads 48 are printing correctly or are in need of cleaning or replacement. In an alternative embodiment, the chart paper 130 may move continuously while the printhead array 40 moves continuously over it, printing a test pattern on the paper.

FIGS. 9A-9J illustrate a system 146 for cleaning a printhead 150. The system 146 is located in the service station 34 (FIG. 1). In one embodiment, the system 146 includes a cleaning station 148 made up generally of a latch pawl 152, a spring 154, a squeegee 156, a printhead cap 158, a cap carrier 192, a second spring 162, and a cam track 164. Only a single cleaning station 148 is shown for descriptive purposes; however, multiple stations 148 may be disposed in the service station 34. Alternatively, a single cleaning station 148 may service multiple printheads 150 by, for example, successively positioning the printheads 150 relative to the cleaning station 148.

FIG. 9A represents a starting position of the cleaning system 146. As shown in FIG. 9B, the printhead 150 approaches the cleaning station 148 and engages the latch pawl 152. The latch pawl 152 is actuated as the printhead 150 passes over the latch pawl 152. The printhead 150 continues to move past the latch pawl 152 and engages the squeegee 156 (FIG. 9C). The printhead 150 passes over squeegee 156. As shown in FIG. 9D, the printhead 150 contacts the cap carrier 192, which is driven along the cam track 164 and compresses the spring 162. The printhead cap 158 is positioned against a printhead face 160 (FIGS. 9E and 9F). As shown in FIG. 9F, the printhead cap 158 seals against the printhead face 160 while the face 160 is rinsed with wash fluid (see FIG. 10).

After the printhead face 160 is cleaned, the printhead 150 begins to move out of the cleaning station 148 (FIG. 9G). The latch pawl 152 engages the cap carrier 192, halting its movement. As shown in FIG. 9H, the printhead 150 engages the squeegee 156, which wipes the printhead face 160. In an alternative embodiment, the squeegee 156 vibrates to further clean the printhead face 160. The printhead 150 continues its forward movement, actuating the latch pawl 152 (FIG. 9I), which, in turn, releases the cap carrier 192 (FIG. 9J). The cap carrier 192 snaps back to the start position. The system 146 is now ready to clean another printhead 150.

FIG. 10 depicts the action of FIG. 9F in greater detail. The printhead 150 is positioned with the printhead face 160 against the printhead cap 158, which in this embodiment is made of rubber. The cap includes a seal lip 172 for sealing about the printhead face 160. The cleaning station 148 is coupled to a wash fluid supply container 182 via a supply duct 184 and a wash fluid return container 186 via a return duct 188. The wash fluid return container 186 is in communication with a vacuum source 180, in this case a vacuum pump, via a vacuum duct 190. Additionally, a valve 178 is located in the return duct 188. The valve 178 may be manually or automatically actuated.

In operation, the vacuum source 180 creates a vacuum within a cavity 174 in the printhead cap 160. The vacuum pulls wash fluid from the supply container 182 through the supply duct 184. The wash fluid enters the cavity 174 as a spray 176 against the printhead face 160. The spray 176 washes debris, such as excess build material and dried binder, off the printhead face 160. The used wash fluid and debris are drawn out of the cavity 174 by the vacuum source 180 and into the return container 186 via the return duct 188. Additionally, the negative pressure created in the cavity 174 by the vacuum source 180 prevents the wash fluid from entering the jet nozzles and, in fact, may cause a small amount of binder to flow out of the nozzles to flush any powdered build material out of the nozzle. Blockages or obstructions in the jet nozzles can cause the jets to fire in the wrong direction. Once the operation is complete, the system 148 moves onto the step depicted in FIG. 9G.

Figure 11:
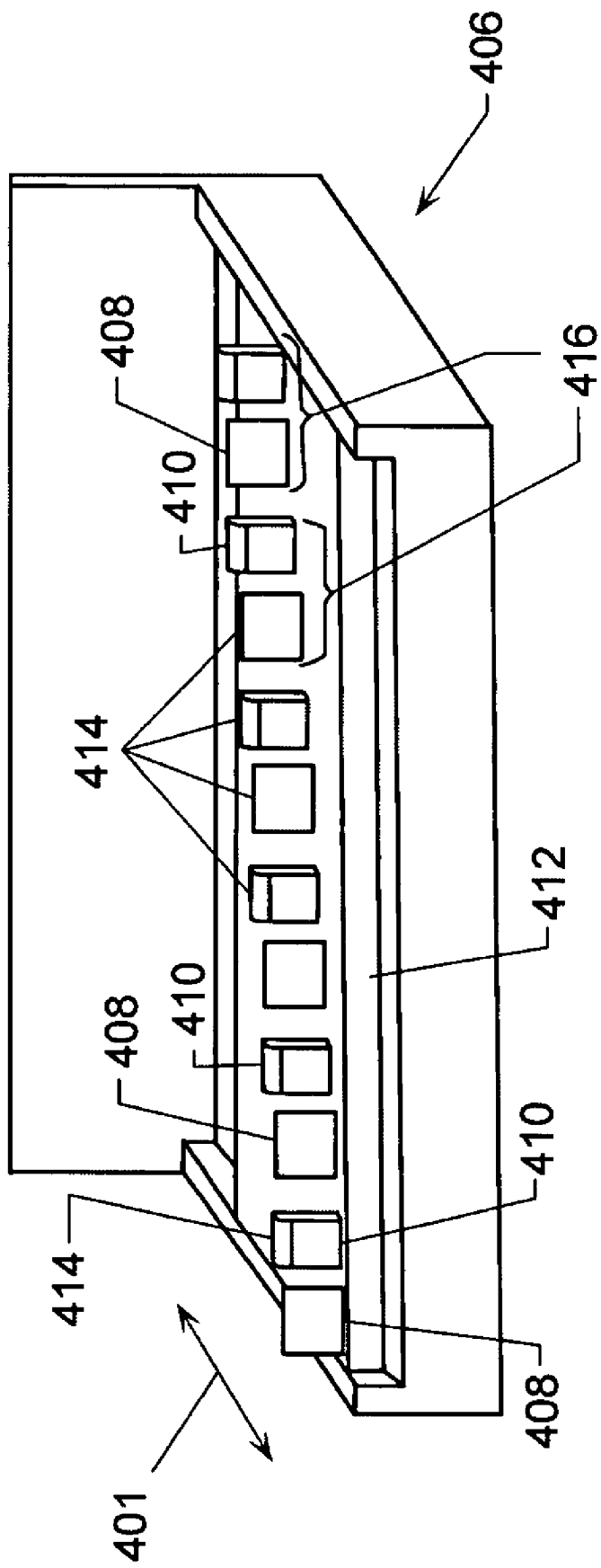
FIG. 11 is a schematic perspective view of an alternative embodiment of a printhead cleaning station in accordance with the invention.

FIG. 11 depicts an alternative embodiment of a cleaning station, also referred to as a reconditioning station 406. The reconditioning station 406 is shown removed from the printing apparatus 10; however, the reconditioning station 406 can be included on the printbar assembly 18 or in the service station 34. The reconditioning station 406 includes a plurality of wiping elements 408 and a plurality of lubricators 410. The wiping elements 408 and the lubricators 410 are mounted on a plate 412 that can be actuated to travel, as indicated by arrow 401. The engaging surfaces 414 of the wiping elements 408 and the lubricators 410 are disposed upwards so that when the printhead 476 is in the reconditioning station 406, the wiping elements 408 and the lubricators 410 clean the printheads 476 from below (FIGS. 12A-12C). Also, in the illustrated embodiment, one wiper 408 and one lubricator 410 acting as a pair 416 are used to clean each printhead 476. Further, in the illustrated embodiment, each wiper and lubricator pair 416 are offset from each other to correspond with the offset spacing of the printheads 476 (see, for example, printheads 48 in FIG. 8A). In other embodiments, however, any number of wiping elements 408 and lubricators 410 can be used to clean the printheads 476, and the wiping elements 408 and lubricators 410 can be spaced using any desirable geometry.

FIGS. 12A-12C depict one method of using the reconditioning station 106. The printhead(s) 476 is disposed above the reconditioning station 406 (FIG. 12A). The plate 412 on which the wiping elements 408 and lubricators 410 are mounted is then actuated into alignment with the printheads 476, and the printheads 476 are wiped and lubricated from beneath to remove any accumulated grit and to improve the flow of binding material out of the printheads 476. Specifically, the lubricator 410 applies a lubricant to the printhead face 477 to moisten any debris on the printhead face 477. Then, the printhead 476 is moved to pass the printhead face 477 over the wiping element 408 (e.g., a squeegee), which wipes the printhead face 477 clean. Alternatively, the printhead face 477 could be exposed to a vacuum source to remove any debris present thereon.

FIGS. 13A-13D depict an alternative embodiment of a reconditioning station 506 in accordance with the invention. The reconditioning station 506 may also be mounted in the service station 34. The reconditioning station 506 includes a reservoir 542 that holds a washing solution 543 and a pump 545 that delivers the washing solution 543 under pressure to at least one nozzle 540 and preferably an array of nozzles 540. The nozzles 540 are capable of producing a high velocity stream of washing solution 543. In operation, the nozzles 540 are directed to the printhead face 577 of the printhead 576. When directed onto the printhead face 577, the washing solution 543 loosens and removes contaminants, such as build material and binding material, from the printhead face 577. The orientation of the nozzles 540 may be angled with respect to the printhead face 577, such that a fluid flow is induced across a plane of the printhead face 577. For example, the washing solution can contact the printhead 576 at the side nearest the nozzles 540 and drain from the side of the printhead 576 furthest from the nozzles 540. This approach improves the efficacy of the stream of washing solution 543 by reducing the accumulation of washing solution on the printhead face 577, as well as the amount of washing solution 543 and debris that would otherwise drain near and interfere with the nozzles 540. A splash guard may also be included in the reconditioning station 506 to contain splashing resulting from the streams of liquid washing solution 543.

It is desirable to remove a large portion of the washing solution 543 that remains on the printhead face 577 after the operation of the nozzles 540 is complete. This is conventionally accomplished by drawing a wiping element 408 across the printhead face 477, as shown in FIG. 12C. A disadvantage of this approach is that contact between the wiping element 408 and the printhead face 477 may degrade the performance of the printhead 476 by, for example, damaging the edges of the inkjet nozzle orifices. Accordingly, it is an object of this invention to provide a means of removing accumulated washing solution from the printhead face 577, without contacting the delicate region around the inkjet nozzles. In one embodiment, a wicking member 544 may be disposed such that the printhead face 577 may pass one or more times over its upper surface 546 in close proximity, without contact, allowing capillary forces to draw accumulated washing solution 543 away from the printhead face 577. The wicking member 544 may be made from rigid, semi-rigid, or compliant materials, and can be of an absorbent or impermeable nature, or any combination thereof.

For the wicking member 544 to effectively remove accumulated washing solution 543 from the printhead face 577, the gap between the upper surface 546 of the wicking member 544 and the printhead face 577 must be small, a desirable range being between about 0 inches to about 0.03 inches. A further object of this invention is to provide a means for maintaining the gap in this range without resort to precise, rigid, and costly components.

In another embodiment, the wicking member 544 may consist of a compliant rubber sheet oriented approximately orthogonal to the direction of relative motion 547 between the wicking member 544 and the printhead 576 and with a portion of its upper edge 546 disposed so that it lightly contacts or interferes with the printhead face 577 only in non-critical areas away from the printhead nozzle orifices. The upper edge 546 of the wicking member 544 may include one or more notches 548 at locations where the wicking member 544 might otherwise contact delicate components of the printhead face 577. System dimensions are selected so that the wicking member 544 always contacts the printhead face 577, and is deflected as the printhead 576 passes over it, independent of expected variations in the relative positions of the printhead 576 and the reconditioning station 506. The upper edge 546 accordingly follows the position of the printhead face 577, maintaining by extension a substantially constant space between the printhead face 577 and the relieved surface notch 548. To further prolong the life of the printhead 576, a bending zone of the wicking object 544 can be of reduced cross-section to provide reliable bending behavior with little deformation of the upper edge 546 of the wicking member 544.

Figure 13B:
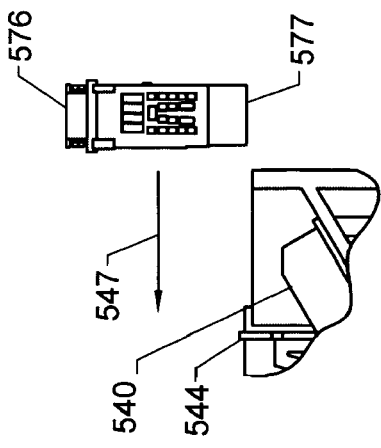
FIGS. 13A-13D are schematic perspective views of another alternative embodiment of a printhead cleaning station in accordance with the invention.
Figure 13A:
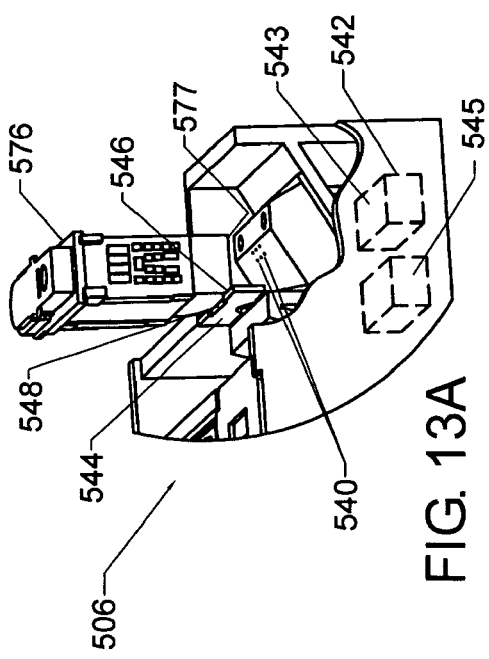
Figure 13D:
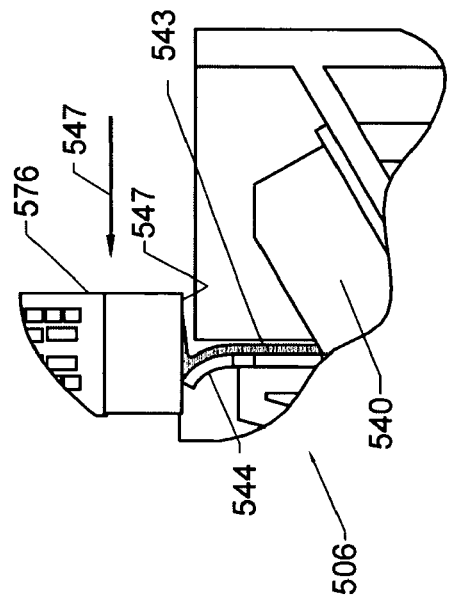
Figure 13C:
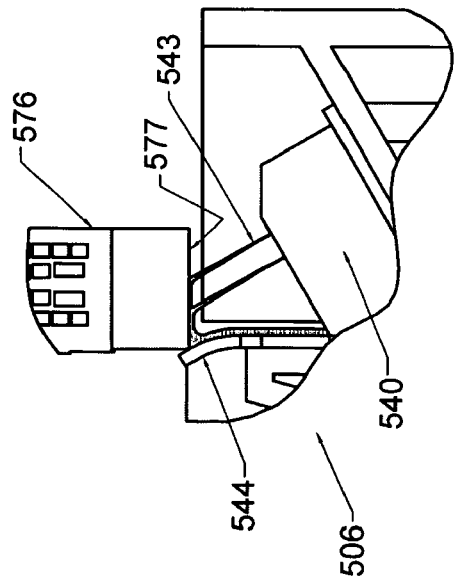

FIGS. 13B-13D illustrate a reconditioning cycle in accordance with the invention. FIG. 13B shows the printhead 576 approaching the reconditioning station 506 along the path 547. When the printhead 576 lightly contacts the wiping member 544, as shown in FIG. 13C, motion stops along the path 547 and the washing solution 534 is directed at the printhead face 577 by the nozzle array 540. When the spraying operation is complete, the printhead 576 continues to travel along the path 547, as shown in FIG. 13D. The wiping member 544 is further deflected to allow passage of the printhead 576, and the accumulated washing solution 543 is wicked away from the printhead face 577. After being sprayed and wiped, the printhead 576 may print a plurality of droplets to eject any washing solution that may have been ingested during the reconditioning process.

Additional cleaning methods are contemplated, such as wiping the printhead face with a cylindrical "paint roller" that cleans and moistens itself by rolling in a reservoir of wash fluid. In another embodiment, a cleaning system could include a continuous filament that carries wash fluid up to a printhead face and carries debris away to a sump. The system may include a small scraper that can be run over the filament to remove built up debris.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. An apparatus for fabricating a three-dimensional object from a representation of the object stored in memory, the apparatus comprising:
   a rotary annular build drum for receiving successive layers of a build material therein; and
   an array of at least one printhead disposed above the annular build drum, wherein the at least one printhead is configured for selectively dispensing droplets of a liquid binder onto the build material.

2. The apparatus of claim 1, wherein the rotary annular build drum rotates continuously.

3. The apparatus of claim 1 further comprising a build material delivery system comprising:
   a storage means for holding the build material; and
   a conveying means for delivering the build material to the annular build drum.

4. The apparatus of claim 3 further comprising:
   at least two storage chambers for holding at least two build material components separate from each other; and
   a blender for mixing the build material components in a predetermined ratio prior to delivery to the annular build drum.

5. The apparatus of claim 1 further comprising a spreader for distributing die build material over at least a portion of the annular build drum.

6. The apparatus of claim 5, wherein the spreader comprises a counter-rotating roller.

7. The apparatus of claim 6, wherein the counter-rotating roller is skewed with respect to a radius of the rotary annular build drum to induce excess build material to migrate over an inner edge of the annular build drum.

8. The apparatus of claim 7 further comprising a sensor disposed below the inner edge of the annular build drum to detect an amount of the excess build material.

9. The apparatus of claim 8, wherein an amount of build material delivered to the annular build drum is adjusted in response to the amount of excess build material detected.

10. The apparatus of claim 1, wherein the array is configured to dispense droplets of the liquid binder over an entire surface of the annular build drum by continuous consecutive radial scanning motions of the at least one printhead.

11. The apparatus of claim 1, wherein the array is configured to dispense droplets of the liquid binder at substantially any radial location of the rotary annular build drum without adjustment.

12. The apparatus of claim 11, wherein the array can be adjusted incrementally radially.

13. The apparatus of claim 1, wherein the array can be displaced from a normal printing position for servicing.

14. The apparatus of claim 13, wherein the array can be displaced radially with respect to the rotary annular build drum.

15. The apparatus of claim 1, wherein the array includes redundant printheads.

16. The apparatus of claim 1, wherein the apparatus defines an opening for removing the three-dimensional object.

17. The apparatus of claim 16, wherein the three-dimensional object is removed through at least one of a bottom opening and a side opening of the annular build drum.

18. The apparatus of claim 1 further comprising a sensor to monitor at least one performance characteristic of the apparatus, wherein the characteristic is selected from the group consisting of print quality, printing errors, print speed, printhead condition, and drum position.

19. The apparatus of claim 18, wherein operation of the apparatus is modified in response to a signal received from the sensor.

20. The apparatus of claim 19, wherein the array is movable in response to the signal from the sensor.

21. The apparatus of claim 1 further comprising a plurality of rotary annular build drums.

22. An apparatus for fabricating a three-dimensional object from a representation of the object stored in memory, the apparatus comprising:

an annular build drum for receiving successive layers of a build material therein; and an array of at least one printhead disposed above the annular build and movable relative to the annular build drum wherein the at least one printhead is configured for selectively dispensing droplets of a liquid binder onto the build material.

23. The apparatus of claim 22, wherein the array is movable over at least a portion of a build surface defined by the annular build drum.

24. The apparatus of claim 22, wherein the array is configured to dispense droplets of the liquid binder at substantially any radial location of the annular build drum by moving the array radially to a desired location.

25. The apparatus of claim 22, wherein the array moves continuously about the annular build drum.

26. The apparatus of claim 22, wherein the annular build drum is movable in a vertical direction.

* * * * *